(12) United States Patent
Lee et al.

(10) Patent No.: US 11,334,084 B2
(45) Date of Patent: May 17, 2022

(54) APPARATUS AND METHOD OF GENERATING MAP DATA OF CLEANING SPACE

(71) Applicant: SAMSUNG ELECTRONICS CO., LTD., Suwon-si (KR)

(72) Inventors: Junghwan Lee, Suwon-si (KR); Daehun Kim, Suwon-si (KR); Hyunseok Hong, Suwon-si (KR); Junggap Kuk, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 345 days.

(21) Appl. No.: 16/734,639

(22) Filed: Jan. 6, 2020

(65) Prior Publication Data

US 2020/0218274 A1 Jul. 9, 2020

(30) Foreign Application Priority Data

Jan. 4, 2019 (KR) .................. 10-2019-0001302

(51) Int. Cl.
*G05D 1/02* (2020.01)
*G05D 1/00* (2006.01)
(Continued)

(52) U.S. Cl.
CPC .......... *G05D 1/0221* (2013.01); *A47L 9/2826* (2013.01); *A47L 9/2852* (2013.01);
(Continued)

(58) Field of Classification Search
CPC .. G05D 1/0221; G05D 1/0016; G05D 1/0088; G05D 1/0246; G05D 2201/0203;
(Continued)

(56) References Cited

U.S. PATENT DOCUMENTS 9,052,719 B2   6/2015  Lee et al.
9,402,518 B2   8/2016  Burlutskiy
(Continued)

FOREIGN PATENT DOCUMENTS

KR   10-2016-0038437   4/2016
KR   10-1708301        2/2017
(Continued)

OTHER PUBLICATIONS

Non-Final Rejection dated Sep. 4, 2020 in counterpart Korean Application No. 10-2019-0001302 and English language translation thereof.
(Continued)

*Primary Examiner* — Bhavesh V Amin
(74) *Attorney, Agent, or Firm* — Nixon & Vanderhye, P.C.

(57) ABSTRACT

Provided are an artificial intelligence (AI) system using a machine learning algorithm like deep learning, or the like, and an application thereof. A robotic cleaning apparatus that generates map data includes a communication interface comprising communication circuitry, a memory configured to store one or more instructions, and a processor configured to control the robotic cleaning apparatus by executing the one or more instructions. The processor is configured, by executing the one or more instructions, to control the robotic cleaning apparatus to: generate basic map data related to a cleaning space, and generate object information regarding at least one object in the cleaning space, the object information being generated based on information obtained by the robotic cleaning apparatus regarding the object in a plurality of different positions of the cleaning space, and including information about a type and a position of the object.

20 Claims, 24 Drawing Sheets

(51) Int. Cl.
*A47L 9/28* (2006.01)
*A47L 11/40* (2006.01)
*G06T 7/70* (2017.01)
*G06V 20/10* (2022.01)

(52) U.S. Cl.
CPC ....... *A47L 11/4011* (2013.01); *A47L 11/4061* (2013.01); *G05D 1/0016* (2013.01); *G05D 1/0088* (2013.01); *G05D 1/0246* (2013.01); *G06T 7/70* (2017.01); *G06V 20/10* (2022.01); *A47L 2201/04* (2013.01); *G05D 2201/0203* (2013.01); *G06T 2207/20081* (2013.01)

(58) Field of Classification Search
CPC ......... G05D 2201/0215; G05D 1/0044; G05D 1/0251; G05D 1/0268; A47L 9/2826; A47L 9/2852; A47L 11/4011; A47L 11/4061; A47L 2201/04; A47L 9/2805; A47L 9/2857; G06K 9/00664; G06T 7/70; G06T 2207/20081; G01C 21/12; G01C 11/30; G01C 21/206
See application file for complete search history.

(56) References Cited

U.S. PATENT DOCUMENTS

| | | | | |
|---|---|---|---|---|
| 9,538,702 B2* | 1/2017 | Balutis | ................. | G05D 1/0219 |
| 9,798,957 B2* | 10/2017 | Noh | ................. | G06V 20/20 |
| 9,826,678 B2* | 11/2017 | Balutis | ................. | G05D 1/0234 |
| 10,159,180 B2* | 12/2018 | Balutis | ................. | G05D 1/0221 |
| 10,175,688 B2 | 1/2019 | Shin et al. | | |
| 10,874,045 B2* | 12/2020 | Balutis | ................. | B25J 9/1674 |
| 11,151,357 B2* | 10/2021 | Kim | ................. | G06K 9/6271 |
| 2001/0018640 A1* | 8/2001 | Matsunaga | ........... | G05D 1/0274 |
| | | | | 382/168 |
| 2003/0120389 A1* | 6/2003 | Abramson | ............ | A47L 9/0494 |
| | | | | 318/568.12 |
| 2010/0070125 A1* | 3/2010 | Lee | ................. | G05D 1/0253 |
| | | | | 701/28 |
| 2015/0223659 A1 | 8/2015 | Han et al. | | |
| 2016/0089783 A1* | 3/2016 | Noh | ................. | G06V 10/40 |
| | | | | 901/1 |
| 2016/0162894 A1* | 6/2016 | Sun | ................. | G06Q 20/10 |
| | | | | 705/44 |
| 2016/0298970 A1* | 10/2016 | Lindhe | ................. | A47L 11/4066 |
| 2017/0361468 A1 | 12/2017 | Cheuvront et al. | | |
| 2018/0074508 A1 | 3/2018 | Kleiner et al. | | |
| 2019/0332121 A1* | 10/2019 | Kim | ................. | A47L 9/2852 |

FOREIGN PATENT DOCUMENTS

| | | |
|---|---|---|
| KR | 10-2017-0087403 | 7/2017 |
| KR | 10-2018-0018624 | 2/2018 |
| KR | 10-2018-0058303 | 6/2018 |
| KR | 10-2018-0082264 | 7/2018 |

OTHER PUBLICATIONS

International Search Report and Written Opinion dated Apr. 10, 2020 in counterpart International Patent Application No. PCT/KR2020/000095.

* cited by examiner

FIG. 7
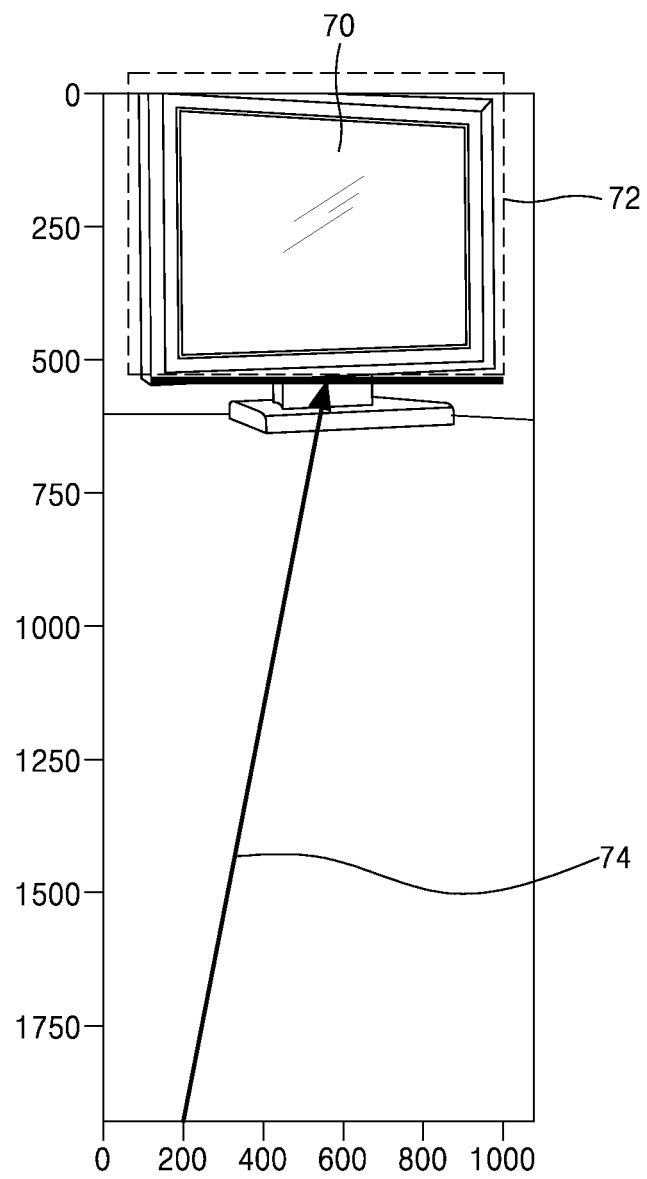
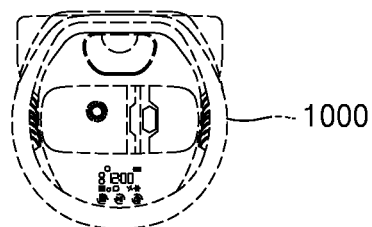

FIG. 8

| OBJECT TYPE | COORDINATES OF BORDER BOX OF OBJECT | | | | RELIABILITY | TIME |
| --- | --- | --- | --- | --- | --- | --- |
| TV | (200, 490) | (900, 490) | (200, 50) | (900, 50) | 60% | 15:23:04 |

```
INPUT ADDRESS FOR
CONFIGURING MAP

Address 1 [        ]
Address 2 [        ]
     City [        ]
    State [        ]
 Zip Code [        ]

[ OK ]
```

APPARATUS AND METHOD OF GENERATING MAP DATA OF CLEANING SPACE

CROSS-REFERENCE TO RELATED APPLICATION

This application is based on and claims priority under 35 U.S.C. § 119 to Korean Patent Application No. 10-2019-0001302, filed on Jan. 4, 2019, in the Korean Intellectual Property Office, the disclosure of which is incorporated by reference herein in its entirety.

BACKGROUND

1. Field

The disclosure relates to an apparatus and method of generating map data of a cleaning space, and for example, to an apparatus and method of generating map data of a cleaning space by identifying an object in the cleaning space and determining an identification value of a region of the map data.

2. Description of Related Art

An artificial intelligence (AI) system may refer to a computer system that implements human-level intelligence, and allows a machine to self-train, make decisions, and become smarter, unlike an existing rule-based smart system. The more an AI system is used, the greater its recognition rate and the more accurately a user's preferences may be understood. Thus, existing rule-based smart systems have been gradually replaced with deep-learning-based AI systems.

AI technology includes machine learning (e.g., deep learning) and element technologies using machine learning.

Machine learning refers to an algorithm technology in which a machine classifies and learns characteristics of input data by itself. Element technologies refer to technologies using a machine learning algorithm, such as deep learning, and may be divided into fields of linguistic understanding, visual understanding, reasoning/prediction, knowledge representation, operation control, etc.

AI technology is employed in various fields. For example, linguistic understanding refers to technology for recognizing, applying, and processing verbal/written language of a human and includes natural language processing, machine translation, a conversation system, question and answer, and voice recognition/synthesis. Visual understanding refers to technology for recognizing and processing objects as in human vision and includes object recognition, object tracking, image search, human recognition, scene understanding, space understanding, image improvement, etc. Reasoning/prediction refers to technology for determining information and executing logical reasoning and prediction and includes knowledge/probability-based reasoning, optimization prediction, preference-based planning, recommendation, etc. Knowledge representation refers to technology for automated processing of human experience information into knowledge data and includes knowledge construction (generating/classifying data), knowledge management (utilizing data), etc. Operation control refers to technology for controlling automated driving of a vehicle and motion of a robot and includes motion control (navigation, collision, driving), manipulation control (behavior control), etc.

A robotic cleaning apparatus needs to generate accurate map data of a cleaning space by determining identification values of divided regions of the cleaning space, and needs to be effectively controlled based on the generated map data.

SUMMARY

Embodiments of the disclosure provide an apparatus and method of generating map data of a cleaning space, by which regions of the cleaning space may be divided and identification values for the divided regions may be determined.

In addition, example embodiments of the disclosure provide an apparatus and method of generating map data of a cleaning space, by which objects in the cleaning space are accurately recognized, thereby generating the map data using basic map data.

Moreover, example embodiments of the disclosure provide an apparatus and method of generating map data of a cleaning space, by which an object in the cleaning space and an identification value for a divided region may be determined using at least one AI model.

Additional aspects will be set forth in part in the description which follows and, in part, will be apparent from the description, or may be learned by practice of the presented embodiments of the disclosure.

According to an example aspect of the disclosure, a robotic cleaning apparatus that generates map data includes a communication interface comprising communication circuitry, a memory configured to store one or more instructions, and a processor configured to control the robotic cleaning apparatus by executing the one or more instructions, to: generate basic map data related to a cleaning space, generate object information regarding at least one object in the cleaning space, divide an area in the basic map data into a plurality of regions based on the object information, and determine identification values of the plurality of divided regions based on the object information.

According to another example aspect of the disclosure, a method, performed by a robotic cleaning apparatus, of generating map data includes: generating basic map data related to a cleaning space, generating object information regarding at least one object in the cleaning space, dividing an area in the basic map data into a plurality of regions based on the object information, and determining identification values for the plurality of divided regions based on the object information.

According to yet another example aspect of the disclosure, a computer program product including a non-transitory computer-readable recording medium having recorded thereon a program for executing the method on a computer is provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 7 is a diagram illustrating an example of an object image captured by a robotic cleaning apparatus according to various embodiments of the disclosure;

FIG. 8 is a diagram illustrating an example of object identification data generated from an object image, according to various embodiments of the disclosure;

FIG. 16 is a diagram illustrating an example of a graphical user interface (GUI) for obtaining reference map data according to various embodiments of the disclosure;

DETAILED DESCRIPTION

Figure 1:
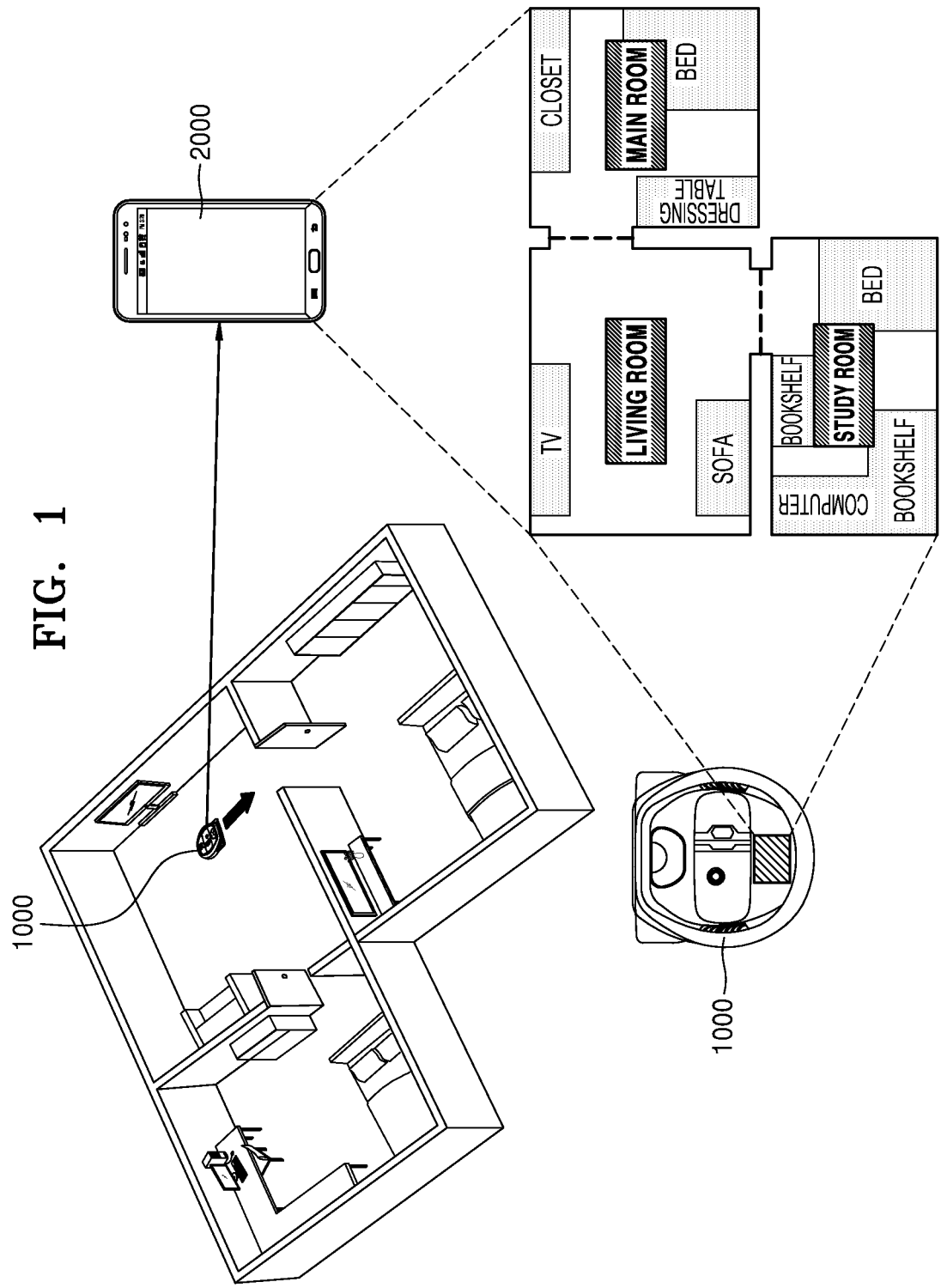
FIG. 1 is a diagram illustrating an example system allowing a robotic cleaning apparatus to generate map data, according to various embodiments of the disclosure.

Hereinafter, various example embodiments of the disclosure will be described in greater detail with reference to the attached drawings. However, the disclosure may be implemented in various forms, and are not limited to the embodiments described herein. To clearly describe the disclosure, parts that are not associated with the description may be omitted from the drawings, and throughout the disclosure, identical reference numerals refer to identical parts.

Throughout the disclosure, the expression "at least one of a, b or c" indicates only a, only b, only c, both a and b, both a and c, both b and c, all of a, b, and c, or variations thereof.

In a description of the example embodiments of the disclosure, when a part is connected to another part, the part is not only directly connected to another part but also electrically connected to another part with another device intervening in them. When it is assumed that a certain part includes a certain component, the term 'including' may refer, for example, to a corresponding component further including other components unless a specific meaning opposed to the corresponding component is written.

A function related to AI according to the disclosure may, for example, be performed through a processor and a memory. The processor may include one processor or a plurality of processors. For example, one processor or a plurality of processors may include, for example, and without limitation, a general-purpose processor such as a CPU, an application processor (AP), a digital signal processor (DSP), etc., a graphic-dedicated processor such as a GPU, a vision processing unit (VPU), etc., and an AI-dedicated processor such as a neural processing Unit (NPU). One processor or a plurality of processors may control data to be processed according to a predefined operation rule or AI model stored in the memory. When one processor or a plurality of processors include an AI-dedicated processor, the AI-dedicated processor may be designed as a hardware structure specialized for processing a specific AI model.

The predefined operation rule or AI model may be made through training. Herein, when the predefined operation rule or AI model is made through training, it may refer, for example, to a basic AI model being trained using multiple training data based on a learning algorithm so as to execute desired characteristics (or purpose), thus making the predefined operation rule or AI model. Such training may be performed by a device on which AI according to the disclosure is implemented or by a separate server and/or a system. Examples of a learning algorithm may include, but is not limited to, supervised learning, unsupervised learning, semi-supervised learning, reinforcement learning, or the like.

An AI model may include a plurality of neural network layers. Each of the plurality of neural network layers may have a plurality of weight values, and a neural network operation is performed based on an operation between an operation result of a previous layer and the plurality of weight values. The plurality of weight values of the plurality of neural network layers may be optimized due to a training result of the AI model. For example, the plurality of weight values may be updated to reduce or minimize a loss value or a cost value obtained in the AI model during learning. Examples of the AI neural network may include, but is not limited to, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or the like.

Hereinafter, the disclosure will be described with reference to the accompanying drawings.

FIG. 1 is a diagram illustrating an example system allowing a robotic cleaning apparatus to generate map data, according to various embodiments of the disclosure.

A robotic cleaning apparatus 1000 may clean a cleaning space while moving around the cleaning space. The cleaning space may be a space needing cleaning, for example, a house, an office, etc. The robotic cleaning apparatus 1000 may, for example, be a robotic apparatus capable of moving autonomously using, for example, a wheel, etc., and may perform a cleaning function while moving around the cleaning space.

Referring to FIG. 1, the robotic cleaning apparatus 1000 may generate map data indicating the cleaning space while traveling in the cleaning space. The robotic cleaning apparatus 1000 may be capable of sensing the cleaning space using several sensors of the robotic cleaning apparatus 1000, and may identify a structure of the cleaning space and an object in the cleaning space based on the sensed data. The robotic cleaning apparatus 1000 may identify a type and a position of the object in the cleaning space, and divide the cleaning space into a plurality of regions based on the identified object. The robotic cleaning apparatus 1000 may estimate names of the divided regions. The robotic cleaning apparatus 1000 may use at least one AI model. The AI model, which may, for example, include an AI algorithm, may be a model trained using, for example, and without limitation, at least one of machine learning, a neural network, a genetic algorithm, deep learning, a classification algorithm, or the like.

The robotic cleaning apparatus 1000 may display the generated map data on a display of the robotic cleaning apparatus 1000. The robotic cleaning apparatus 1000 may provide the map data to the external device 2000 which may display the map data. The map data generated by the robotic cleaning apparatus 1000 may, for example, and without limitation, include the structure of the cleaning space, the divided regions of the cleaning space, names of the regions, the type and the position of furniture, or the like.

The robotic cleaning apparatus 1000 may interpret a user's voice command based on the names of the divided regions in the generated map data. Even when the user's voice command is unclear, the robotic cleaning apparatus 1000 may identify the user making the voice command and determine a divided region related to the user, thereby accurately selecting a cleaning target region.

The robotic cleaning apparatus 1000 may communicate with the external device 2000 or the server through a network. The network may include, for example, and without limitation, a local area network (LAN), a wide area network (WAN), a value added network (VAN), a mobile radio communication network, a satellite communication network, any a combination thereof, or the like, and is a data communication network having a comprehensive meaning, which enables network element entities shown in FIG. 1 to communicate with one another smoothly and may include wired Internet, wireless Internet, and a mobile wireless communication network. Wireless communication may include, but is not limited to, a wireless LAN (wireless fidelity, Wi-Fi), Bluetooth, Bluetooth low energy, ZigBee, Wi-Fi direct (WFD), ultra wideband (UWB), infrared Data Association (IrDA), near field communication (NFC), and so forth.

Figure 2:
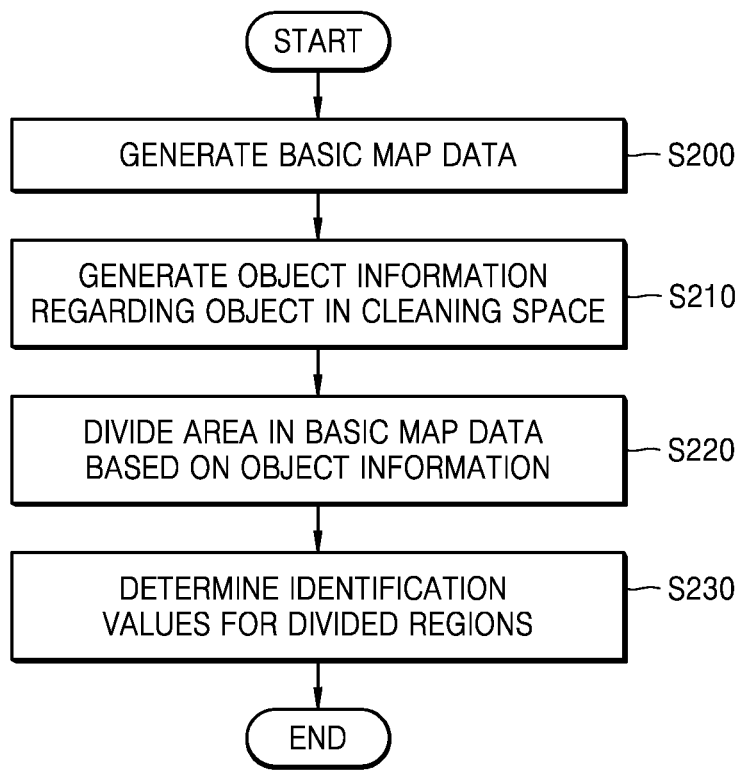
FIG. 2 is a flowchart illustrating an example method, performed by a robotic cleaning apparatus, of generating map data, according to various embodiments of the disclosure.

FIG. 2 is a flowchart illustrating an example method, performed by a robotic cleaning apparatus, of generating map data, according to various embodiments of the disclosure.

In operation S200, the robotic cleaning apparatus 1000 may generate basic map data. While traveling in the cleaning space, the robotic cleaning apparatus 1000 may sense a region where the robotic cleaning apparatus 1000 is allowed to travel in the cleaning space, thus generating the basic map data of the cleaning space. The basic map data may include a map indicating the region where the robotic cleaning apparatus 1000 is allowed to travel in the cleaning space, but may not include information for identifying an object in the cleaning space. The object in the cleaning space may include, but is not limited to, a wall, furniture, home appliances, etc.

When the robotic cleaning apparatus 1000 initially travels in the cleaning space, the robotic cleaning apparatus 1000 may perform a function for generating the basic map data of the cleaning space. The robotic cleaning apparatus 1000 may travel in the cleaning space to generate the basic map data until a preset condition is satisfied.

The robotic cleaning apparatus 1000 may use a reference map to generate the basic map data. For example, the robotic cleaning apparatus 1000 may store a sample of a plane view, and may use the stored sample of the plane view to generate the basic map data.

In operation S210, the robotic cleaning apparatus 1000 may generate object information regarding an object in the cleaning space. While traveling in the cleaning space, the robotic cleaning apparatus 1000 may capture an image of the object in the cleaning space a plurality of times using a camera of the robotic cleaning apparatus 1000. The robotic cleaning apparatus 1000 may generate the object information using a plurality of images generated through capturing of the object. The object information, which indicates an attribute of the object, e.g., a type of the object, a size of the object, a position of the object, etc. The object may include things, for example, and without limitation, furniture, a home appliance, a living tool, etc., in the cleaning space.

The robotic cleaning apparatus 1000 may sense a position and an orientation of the robotic cleaning apparatus 1000 at the time when the image of the object is captured, and measure the time of capturing the image of the object. The robotic cleaning apparatus 1000 may use information about the position and the orientation of the robotic cleaning apparatus 1000, and the time of capturing the image of the object, to generate the object information. To generate the object information, the robotic cleaning apparatus 1000 may use at least one AI model.

In operation S220, the robotic cleaning apparatus 1000 may identify a plurality of regions in the basic map data. The robotic cleaning apparatus 1000 may modify the basic map data based on the type and the position of the object in the cleaning space, and divide an area in the modified basic map data into a plurality of regions. The robotic cleaning apparatus 1000 may modify an outer wall of the cleaning space in the basic map data based on the position of the object, and display the position of the object in the cleaning space. The robotic cleaning apparatus 1000 may identify an object located in the cleaning space, and divide the cleaning space into the plurality of regions based on a type of the object in the cleaning space.

In operation S230, the robotic cleaning apparatus 1000 may determine identification values for the divided regions. The robotic cleaning apparatus 1000 may determine an identification value for a divided region, based on a type of an object in the divided region. When an object is identified in a divided region, the robotic cleaning apparatus 1000 may determine an identification value corresponding to the identified object as an identification value for the divided region. When a combination of objects is identified in a divided region, the robotic cleaning apparatus 1000 may determine an identification value corresponding to the identified combination of the objects as an identification value for the divided region. The robotic cleaning apparatus 1000 may previously store data regarding which region a divided region is highly probable, based on a type of an object identified in the divided region.

For example, when a television (TV) and a sofa are identified in a divided region of the cleaning space, the robotic cleaning apparatus 1000 may determine an identification value for the divided region of the cleaning space as a 'living room'. The robotic cleaning apparatus 1000 may determine an identification value for a divided region, based on a position of an object in the divided region.

Figure 3:
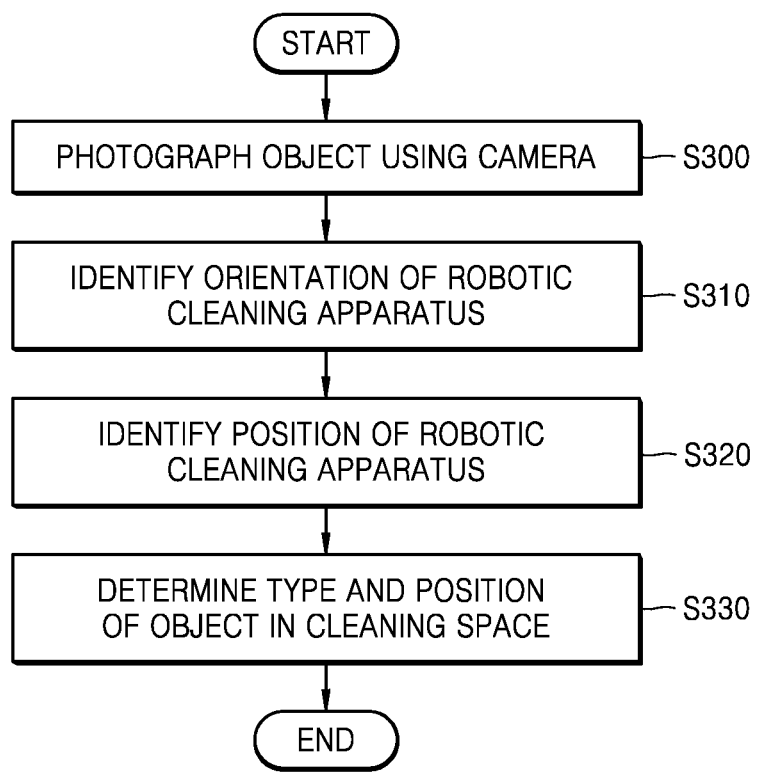
FIG. 3 is a flowchart illustrating an example method, performed by a robotic cleaning apparatus, of determining a type and a position of an object in basic map data, according to various embodiments of the disclosure.

FIG. 3 is a flowchart illustrating an example method, performed by a robotic cleaning apparatus, of determining a type and a position of an object in basic map data, according to various embodiments of the disclosure.

In operation S300, the robotic cleaning apparatus 1000 may capture an image of an object using a camera. While traveling in the cleaning space, the robotic cleaning apparatus 1000 may capture an image of an object in the cleaning space at a plurality of positions a plurality of times. At least one camera may be arranged on the robotic cleaning apparatus 1000 toward the periphery of the robotic cleaning apparatus 1000.

While traveling in the cleaning space, the robotic cleaning apparatus 1000 may monitor whether an object is present in the periphery of the robotic cleaning apparatus 1000 using a camera. When an object is found in the periphery of the robotic cleaning apparatus 1000, the robotic cleaning apparatus 1000 may capture an image of the object using the camera. The robotic cleaning apparatus 1000 may capture the image of the object when the entire object is recognized using the camera.

While traveling in the cleaning space, the robotic cleaning apparatus 1000 may monitor whether an object is present in the periphery of the robotic cleaning apparatus 1000 using at least one sensor. The sensor may include, but is not limited to, an infrared sensor, an ultrasonic sensor, and a lidar sensor. By outputting a sensing signal from the at least one sensor, the robotic cleaning apparatus 1000 may sense an object in the periphery of the robotic cleaning apparatus 1000. When the object in the periphery of the robotic cleaning apparatus 1000 is sensed, the robotic cleaning apparatus 1000 may capture an image of the object using the camera. The robotic cleaning apparatus 1000 may control the camera to capture an image of the entire sensed object.

In operation S310, the robotic cleaning apparatus 1000 may identify an orientation of the robotic cleaning apparatus 1000. The robotic cleaning apparatus 1000 may identify the orientation of the robotic cleaning apparatus 1000 at the time when the image of the object is captured. The robotic cleaning apparatus 1000 may use an orientation sensor to identify the orientation of the robotic cleaning apparatus 1000, in which an orientation value of the robotic cleaning apparatus 1000 may be stored, matching a captured object image.

In operation S320, the robotic cleaning apparatus 1000 may identify the position of the robotic cleaning apparatus 1000. The robotic cleaning apparatus 1000 may identify the position of the robotic cleaning apparatus 1000 at the time when the image of the object is captured. The position of the robotic cleaning apparatus 1000 may be the position of the robotic cleaning apparatus 1000 in the cleaning space. The position of the robotic cleaning apparatus 1000 may be a relative position of the robotic cleaning apparatus 1000 with respect to an object.

In operation S330, the robotic cleaning apparatus 1000 may determine a type and a position of an object in the cleaning space. The robotic cleaning apparatus 1000 may determine the type and the position of the object in the cleaning space, using the captured object image, the orientation value of the robotic cleaning apparatus 1000, and the position of the robotic cleaning apparatus 1000. Thus, the robotic cleaning apparatus 1000 may generate object information including the type and the position of the object in the cleaning space. A detailed method, performed by the robotic cleaning apparatus 1000, of generating object information regarding the object in the cleaning space will be described in greater detail below.

Figure 4:
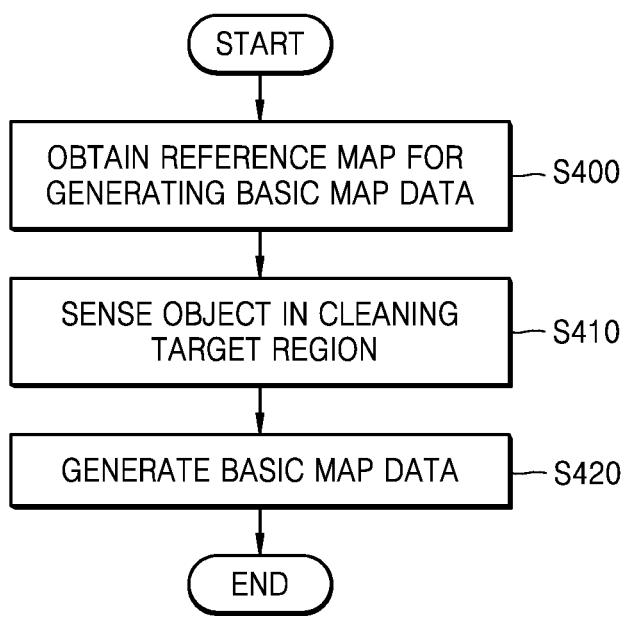
FIG. 4 is a flowchart illustrating an example method, performed by a robotic cleaning apparatus, of generating basic map data, according to various embodiments of the disclosure.

FIG. 4 is a flowchart illustrating an example method, performed by a robotic cleaning apparatus, of generating basic map data, according to various embodiments of the disclosure.

In operation S400, the robotic cleaning apparatus 1000 may obtain a reference map for generating basic map data. The reference map may be a plane view indicating a structure of the cleaning space. The robotic cleaning apparatus 1000 may store reference maps, among which a reference map having a structure that is identical to or similar with that of the cleaning space may be used to generate the basic map data. The robotic cleaning apparatus 1000 may display a graphical user interface (GUI) for determining a reference map and determine the reference map based on a user input made through the GUI.

The user may select a reference map to be used by the robotic cleaning apparatus 1000 using the external device 2000 communication-connected with the robotic cleaning apparatus 1000. The external device 2000 may display a GUI for determining the reference map to be used by the robotic cleaning apparatus 1000. The external device 2000 may select the reference map based on a user input made through the GUI. The selected reference map may be provided from the external device 2000 or the server to the robotic cleaning apparatus 1000.

In operation S410, the robotic cleaning apparatus 1000 may sense an object in a cleaning target region. While traveling in the cleaning space, the robotic cleaning apparatus 1000 may identify a region where the robotic cleaning apparatus 1000 is allowed to travel, by sensing objects in the cleaning space. The robotic cleaning apparatus 1000 may sense the object in the cleaning target region, using, for example, a fall prevention sensor, an infrared sensor, an ultrasonic sensor, a lidar sensor, an obstacle sensor, etc. The robotic cleaning apparatus 1000 may sense, for example, a wall, furniture, a home appliance, etc., in the cleaning space.

In operation S420, the robotic cleaning apparatus 1000 may generate basic map data. The robotic cleaning apparatus 1000 may generate the basic map data using a reference map and sensed data. By identifying a region where the robotic cleaning apparatus 1000 is allowed to travel in the cleaning space, the robotic cleaning apparatus 1000 may generate the basic map data of the cleaning space. The basic map data may include a map indicating the region where the robotic cleaning apparatus 1000 is allowed to travel in the cleaning space, but may not include information for identifying an object in the cleaning space.

The robotic cleaning apparatus 1000 may repeat operations for generating the basic map data until a preset condition is satisfied.

Figure 5:
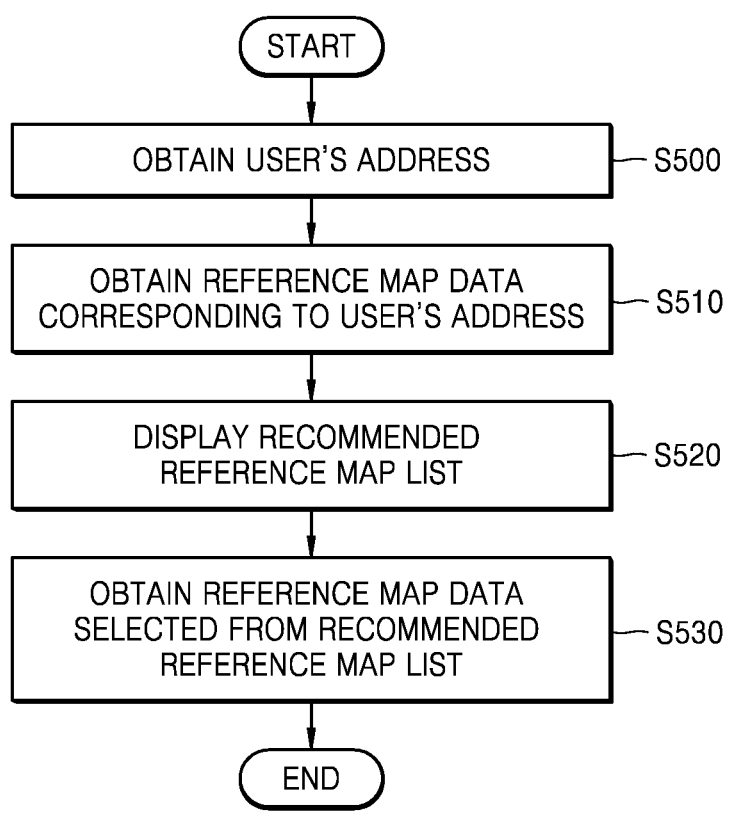
FIG. 5 is a flowchart illustrating an example method, performed by a robotic cleaning apparatus, of obtaining reference map data, according to various embodiments of the disclosure.

FIG. 5 is a flowchart illustrating an example method, performed by a robotic cleaning apparatus, of obtaining reference map data, according to various embodiments of the disclosure.

In operation S500, the robotic cleaning apparatus 1000 may obtain an address of the user. The robotic cleaning apparatus 1000 may display a GUI for inputting a user's address on the display of the robotic cleaning apparatus 1000. The robotic cleaning apparatus 1000 may obtain the user's address based on the user input made through the displayed GUI.

In operation S510, the robotic cleaning apparatus 1000 may obtain reference map data corresponding to the user's address. For example, the robotic cleaning apparatus 1000 may obtain a plane view of an apartment corresponding to the user's address. The robotic cleaning apparatus 1000 may extract or receive the reference map data corresponding to the user's address from a memory or from a server.

While it is described above that the robotic cleaning apparatus 1000 displays the GUI for inputting the user's address, the disclosure is not limited thereto. The external device 2000 communication-connected with the robotic cleaning apparatus 1000 to control the robotic cleaning apparatus 1000 may display a GUI for inputting a user's address. The external device 2000 may obtain the user's address based on the user input made through the displayed GUI. The external device 2000 may provide a reference map corresponding to the user's address to the robotic cleaning apparatus 1000. The external device 2000 may directly transmit the reference map corresponding to the user's address to the robotic cleaning apparatus 1000 or transmit link information for downloading the reference map to the robotic cleaning apparatus 1000. The external device 2000 may request the server 3000 to provide the reference map to the robotic cleaning apparatus 1000.

The robotic cleaning apparatus 1000 may display a recommended reference map list in operation S520, and may obtain reference map data selected from the recommended reference map list in operation S530. The robotic cleaning apparatus 1000 may receive a user input for selecting one of reference maps of the recommended reference map list.

While it is described above that the robotic cleaning apparatus 1000 displays the recommended reference map list, the disclosure is not limited thereto. The external device 2000 communication-connected with the robotic cleaning apparatus 1000 to control the robotic cleaning apparatus 1000 may display the recommended reference map list. The external device 2000 may obtain the reference map based on the user input for selecting the reference map from the displayed recommended reference map list. The external device 2000 may provide the selected reference map to the robotic cleaning apparatus 1000. The external device 2000 may directly transmit the selected reference map to the robotic cleaning apparatus 1000 or transmit link information for downloading the reference map to the robotic cleaning apparatus 1000. The external device 2000 may request the server 3000 to provide the reference map to the robotic cleaning apparatus 1000.

Figure 6:
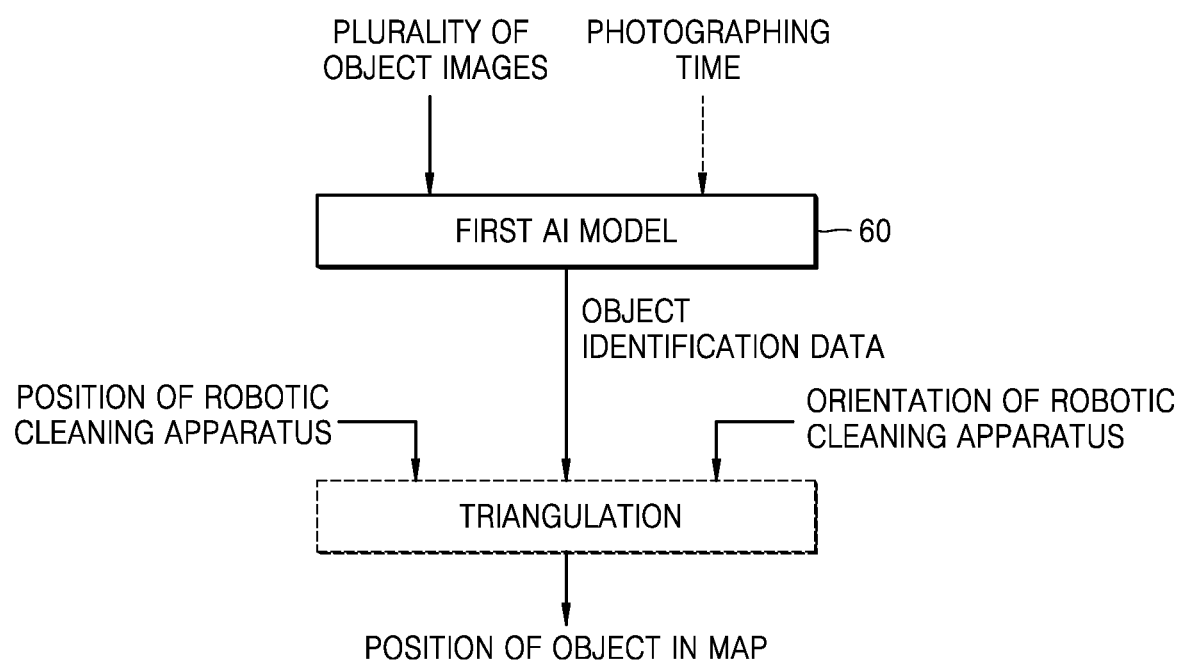
FIG. 6 is a diagram illustrating an example in which a robotic cleaning apparatus determines a position of furniture using a triangulation scheme according to various embodiments of the disclosure.

FIG. 6 is a diagram illustrating an example in which a robotic cleaning apparatus determines a position of furniture using a triangulation scheme according to various embodiments of the disclosure.

Referring to FIG. 6, the robotic cleaning apparatus 1000 may obtain object identification data by inputting a captured object image to a first AI model 60. The object identification data may be data for identifying a position of the object on the image of the object and a type of the object. The object identification data may include, for example, and without limitation, an identification value of the object, coordinates indicating a part where the object is displayed in a picture, information about the time of capturing the image of the object, etc.

The first AI model 60 may, for example, be an AI model for analyzing the object from the captured object image. The first AI model 60 may be a model trained by a manufacturer of the robotic cleaning apparatus 1000 to identify an object in an object image, and may be included in the robotic cleaning apparatus 1000. The first AI model 60 may be based on, for example, a neural network. For example, a model such as, but not limited to, a DNN, an RNN, a BRDNN, or the like may be used as the first AI model 60, without being limited thereto. The robotic cleaning apparatus 1000 may input the time of capturing the image of the object, together with the object image, to the first AI model 60.

The robotic cleaning apparatus 1000 may determine a position of the object in a map using triangulation, based on the object identification data output from the first AI model 60. The robotic cleaning apparatus 1000 may use the object identification data and the orientation and the position thereof, to determine the position of the object in the map. The robotic cleaning apparatus 1000 may determine the position of the object by calculating a relative position between the robotic cleaning apparatus 1000 and the object from the object identification data. The robotic cleaning apparatus 1000 may calculate a position of a particular object using a plurality of pieces of object identification data obtained by capturing an image of the particular object.

FIG. 7 is a diagram illustrating an example of an object image captured by a robotic cleaning apparatus according to various embodiments of the disclosure.

Referring to FIG. 7, the robotic cleaning apparatus 1000 may capture an image of an object 70 in a cleaning space while traveling. The robotic cleaning apparatus 1000 may identify an object 70 in a captured object image as a TV. The robotic cleaning apparatus 1000 may determine a border box 72 of the object 70 by identifying a region where the object 70 is displayed in the captured object image, and generate coordinates indicating the border box 72. The border box 72 of the object 70 may have, for example, a rectangular form.

The robotic cleaning apparatus 1000 may generate a virtual guide line 74 connecting from the position of the robotic cleaning apparatus 1000 at the time when an image of the object 70 is captured, to a central portion of a lower base of the border box 72. The robotic cleaning apparatus 1000 may arrange the object image on the basic map and generate the virtual guide line 74 using the position of the robotic cleaning apparatus 1000 at the time when the image of the object 70 is captured, and the border box 72.

FIG. 8 is a diagram illustrating an example of object identification data generated from an object image, according to various embodiments of the disclosure.

Referring to FIG. 8, object identification data generated from an object image may be generated in the form of an object identification table. The object identification table may store a type of an object, coordinates indicating a border box of the object, reliability of the coordinates, and information about the time of capturing an object image of the object. The object image of the object in the cleaning space may be captured in several directions, and the border box generated from the object in the object image may have an error value from an actual position of the object. Thus, the robotic cleaning apparatus 1000 may give the reliability of the border box according to a specific criterion.

For example, when the border box is located close to a center of the object image, the robotic cleaning apparatus 1000 may give a high reliability of the border box. For example, when a side of the border box is nearly parallel to a border of a basic map, the robotic cleaning apparatus 1000 may give a high reliability of the border box.

The robotic cleaning apparatus 1000 may generate a plurality of object images by capturing an image of an object in several directions, and may generate an object identification table as shown in FIG. 8 for each of the plurality of object images. Thus, a plurality of pieces of object identification data may be generated for each object of the cleaning space.

Figure 9:
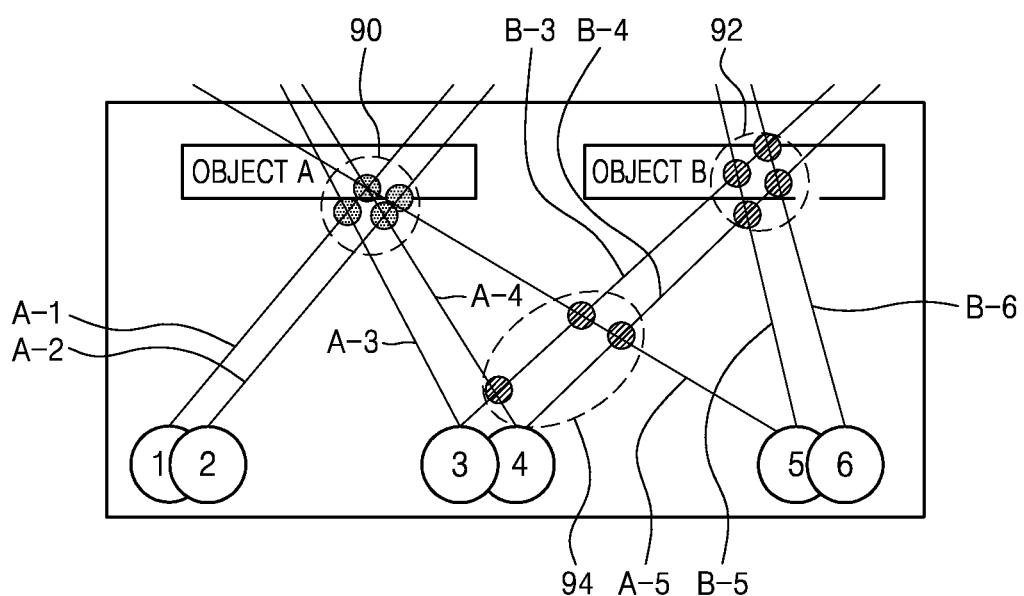
FIG. 9 is a diagram illustrating an example in which a robotic cleaning apparatus estimates a position of an object using a triangulation scheme according to various embodiments of the disclosure.

FIG. 9 is a diagram illustrating an example in which a robotic cleaning apparatus estimates a position of an object using a triangulation scheme according to various embodiments of the disclosure.

Referring to FIG. 9, the robotic cleaning apparatus 1000 may capture an image of an object A at a position '1', a position '2', a position '3', a position '4', and a position '5', and may generate five guide lines A-1, A-2, A-3, A-4, and A-5 from each of a plurality of object images obtained by capturing the object A. The robotic cleaning apparatus 1000 may capture an image of an object B at the position '3', the position '4', the position '5', and the position '6', and may generate four guide lines B-3, B-4, B-5, and B-6 from each of a plurality of object images obtained by capturing the object B.

The robotic cleaning apparatus 1000 may identify intersections 90, 92, and 94 at which nine guide lines A-1, A-2, A-3, A-4, A-5, B-3, B-4, B-5, and B-6 intersect one another. The robotic cleaning apparatus 1000 may identify the intersections 90, the intersections 92, and the intersections 94. The robotic cleaning apparatus 1000 may determine the position of the object A based on the intersections 90, and determine the position of the object B based on the intersections 92. The robotic cleaning apparatus 1000 may ignore the intersections 94 because the intersections 94 have a larger distance error from the object A or the object B than the intersections 90 and the intersections 92.

Figure 10:
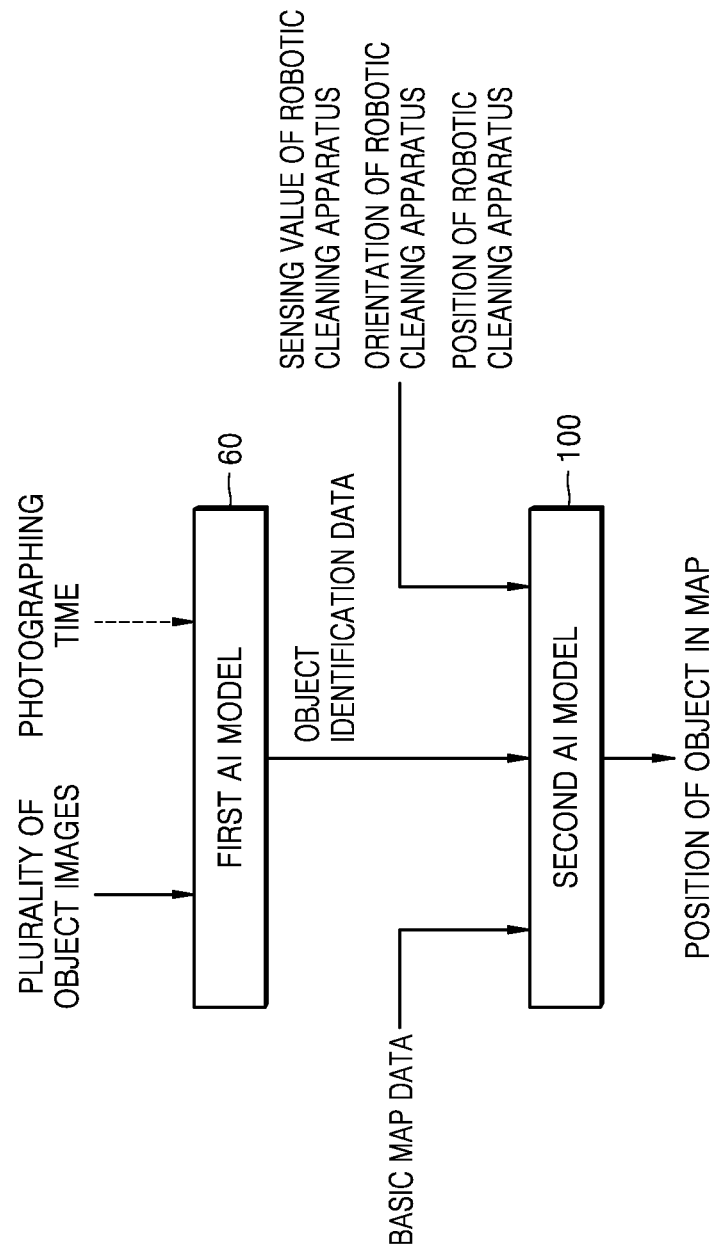
FIG. 10 is a diagram illustrating an example in which a robotic cleaning apparatus determines a position of an object using at least one AI model according to various embodiments of the disclosure.

FIG. 10 is a diagram illustrating an example in which a robotic cleaning apparatus determines a position of an object using at least one AI model according to various embodiments of the disclosure.

Figure 11:
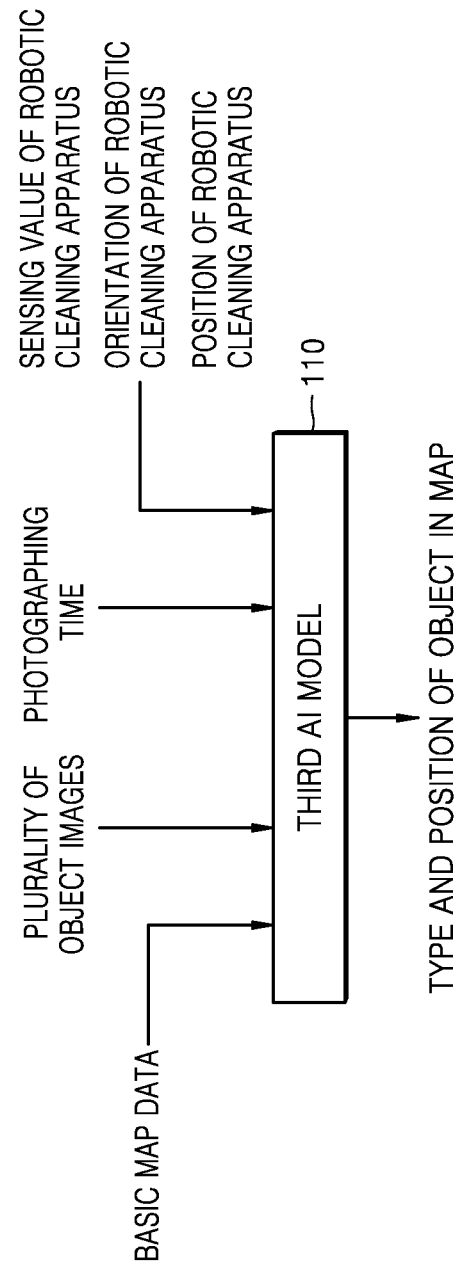
FIG. 11 is a diagram illustrating an example in which a robotic cleaning apparatus determines a position of an object using at least one AI model according to various embodiments of the disclosure.

FIG. 11 is a diagram illustrating an example in which a robotic cleaning apparatus determines a position of an object using at least one AI model according to various embodiments of the disclosure.

Referring to FIG. 10, the robotic cleaning apparatus 1000 may obtain object identification data by inputting a captured object image to a first AI model 60. The robotic cleaning apparatus 1000 may, for example, input the time of capturing the object image of the object, together with the object image, to the first AI model 60.

The robotic cleaning apparatus 1000 may determine a position of the object in a map by inputting the object identification data and the basic map data to a second AI model 100. The second AI model 100 may be an AI model for determining the position of the object in the map using the object identification data. The second AI model 100 may be a model trained by a manufacturer of the robotic cleaning apparatus 1000 to identify an object in an object image, and may be included in the robotic cleaning apparatus 1000. The second AI model 100 may be based on, for example, a neural network. For example, a model such as, but not limited to, a DNN, an RNN, a BRDNN, or the like may be used as the second AI model 100, without being limited thereto. The robotic cleaning apparatus 1000 may input a sensing value, an orientation, and a position of the robotic cleaning apparatus 1000, together with the object identification data and the basic map data, to the second AI model 100. The sensing value, the orientation, and the position of the robotic cleaning apparatus 1000, which are input to the second AI model 100, may be values generated in the robotic cleaning apparatus 1000 when the object image is generated.

Referring to FIG. 11, the robotic cleaning apparatus 1000 may determine a type of an object and a position of the object on a map using a third AI model 110. For example, the robotic cleaning apparatus 1000 may input a sensing value, an orientation, and a position of the robotic cleaning apparatus 1000, together with the object image and the basic map data, to the third AI model 110. The sensing value, the orientation, and the position of the robotic cleaning apparatus 1000, which are input to the third AI model 110, may be values generated in the robotic cleaning apparatus 1000 when the object image is generated.

The third AI model 110 may, for example, be an AI model for determining the position of the object in the map using a plurality of object images. The third AI model 110 may be a model trained by a manufacturer of the robotic cleaning apparatus 1000 to identify an object in an object image, and may be included in the robotic cleaning apparatus 1000. The third AI model 110 may be based on, for example, a neural network. For example, a model such as, but not limited to, a DNN, an RNN, a BRDNN, or the like may be used as the third AI model 110, without being limited thereto.

Hereinafter, with reference to FIGS. 12 through 15, a description will be made of an example of generating map data based on basic map data according to various example embodiments of the disclosure.

Figure 12:
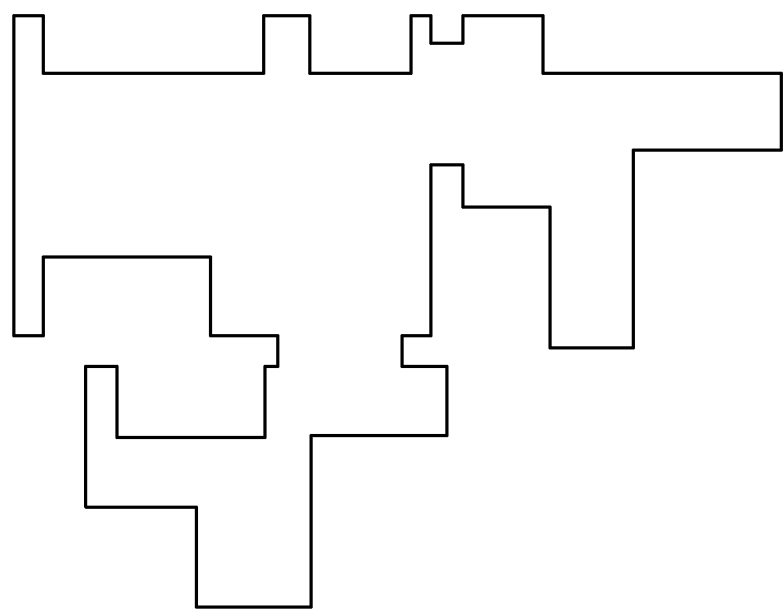
FIG. 12 is a diagram illustrating an example of basic map data according to various embodiments of the disclosure.

FIG. 12 is a diagram illustrating an example of basic map data according to various embodiments of the disclosure.

Referring to FIG. 12, by identifying a region where the robotic cleaning apparatus 1000 is allowed to travel in the cleaning space, the robotic cleaning apparatus 1000 may generate the basic map data of the cleaning space. The basic map data may include a map indicating the region where the robotic cleaning apparatus 1000 is allowed to travel in the cleaning space, but may not include information for identifying an object in the cleaning space. The robotic cleaning apparatus 1000 may repeat operations for generating the basic map data until a preset condition is satisfied.

Figure 13:
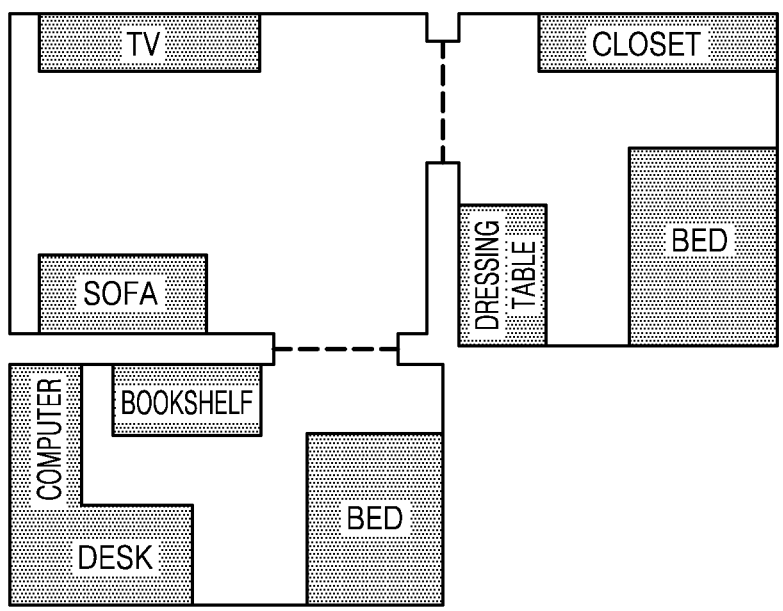
FIG. 13 is a diagram illustrating an example in which a plurality of regions are divided in map data of a cleaning space according to various embodiments of the disclosure.

FIG. 13 is a diagram illustrating an example in which a plurality of regions are divided in map data of a cleaning space according to various embodiments of the disclosure.

Referring to FIG. 13, the robotic cleaning apparatus 1000 may generate map data by modifying the basic map data of FIG. 12. The robotic cleaning apparatus 1000 may modify an outer wall of the cleaning space in the basic map data based on the position of the object, and display the position of the object in the cleaning space. The robotic cleaning apparatus 1000 may display an identification value of the displayed furniture. The robotic cleaning apparatus 1000 may divide the cleaning space in the map into a plurality of regions, taking account of a form of an outer wall in the map data, a type and an identification value of furniture in the map data, a position of the furniture, etc.

Figure 14:
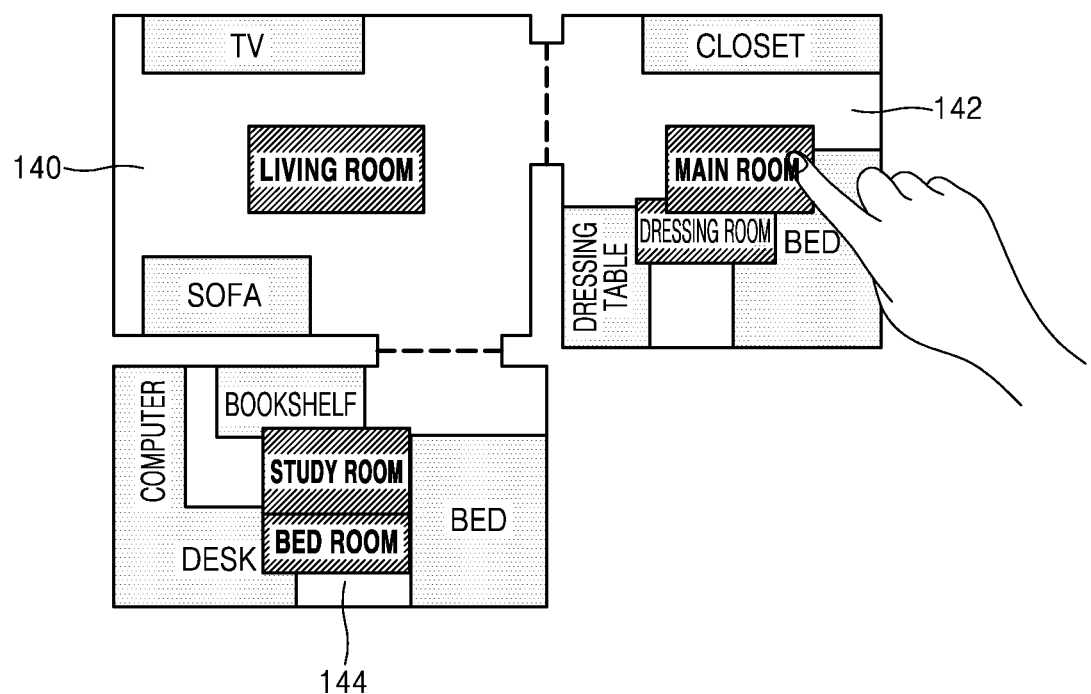
FIG. 14 is a diagram illustrating an example in which a robotic cleaning apparatus determines an identification value of a divided region according to various embodiments of the disclosure.

FIG. 14 is a diagram illustrating an example in which a robotic cleaning apparatus determines an identification value of a divided region according to various embodiments of the disclosure.

Figure 15:
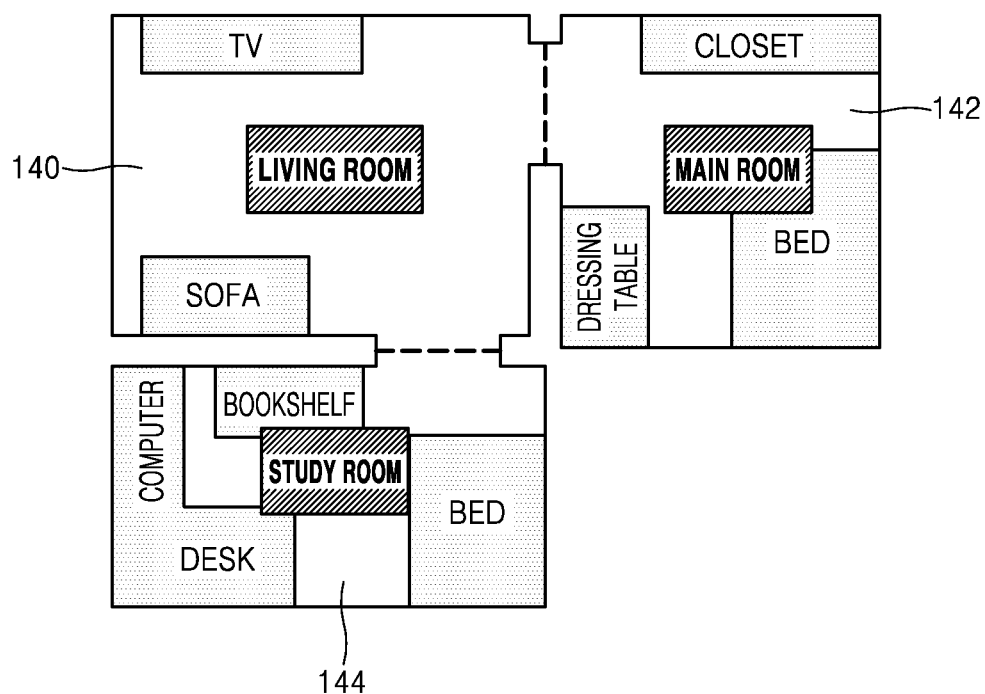
FIG. 15 is a diagram illustrating an example in which a robotic cleaning apparatus determines an identification value of a divided region according to various embodiments of the disclosure.

FIG. 15 is a diagram illustrating an example in which a robotic cleaning apparatus determines an identification value of a divided region according to various embodiments of the disclosure.

Referring to FIG. 14, the robotic cleaning apparatus 1000 may estimate a room name of a divided region by considering a type of furniture in the divided region.

When an object is identified in the divided region, the robotic cleaning apparatus 1000 may estimate an identification value corresponding to the room name by assigning a score to the room name corresponding to the identified object. When a combination of objects is identified in a divided region, the robotic cleaning apparatus 1000 may determine the identification value corresponding to the room name by assigning a score to the room name corresponding to the combination of the objects.

For example, when a bed and a dressing table are identified in a room, the robotic cleaning apparatus 1000 may add 50 points to a main room; when a dressing table and a closet are identified in a room, the robotic cleaning apparatus 1000 may add 50 points to a dressing room. For example, when a bed, a dressing table, and a closet are identified in a room, the robotic cleaning apparatus 1000 may add 30 points to a main room and 30 points to a dressing room. When a blanket and a computer are identified in a room, the robotic cleaning apparatus 1000 may add 40 points to a bed room and subtract 10 points from a study room.

For example, as a living room, a sofa, and a bookshelf are identified in a first divided region 140, the robotic cleaning apparatus 1000 may add 100 points as an identification value for the first divided region 140 to the 'living room'. For example, as a closet, a dressing table, and a bed are identified in a second divided region 142, the robotic cleaning apparatus 1000 may add 80 points to the 'main room' and 20 points to the 'dressing room', as an identification value for the second divided region 142. For example, as a desk, a computer, a bookshelf, and a bed are identified in a third divided region 144, the robotic cleaning apparatus 1000 may add 40 points to the 'study room' and 40 points to the 'bed room', as an identification value for the third divided region 144.

The robotic cleaning apparatus 1000 may determine the 'living room' having added thereto a high score for the first divided region 140 as an identification value for the first divided region 140. The robotic cleaning apparatus 1000 may display the 'living room' on the first divided region 140.

The robotic cleaning apparatus 1000 may recommend the 'main room' and the 'dress room' to the user as the identification value for the second divided region 142, by displaying the 'main room' and the 'dress room' together on the second divided region 142. The robotic cleaning apparatus 1000 may highlight the 'main room' having a higher score when compared to the 'dress room'. The robotic cleaning apparatus 1000 may determine one of the 'main room' and the 'dress room' as the room name of the second divided region 142, based on a user's selection input.

The robotic cleaning apparatus 1000 may recommend the 'study room' and the 'bed room' to the user as the identification value for the third divided region 144, by displaying the 'study room' and the 'bed room' together on the third divided region 144. The robotic cleaning apparatus 1000 may equally display the 'study room' and the 'bed room' as the 'study room' and the 'bed room' have the same score. The robotic cleaning apparatus 1000 may determine one of the 'study room' and the 'bed room' as the room name of the third divided region 144, based on a user's selection input. The robotic cleaning apparatus 1000 may additionally provide to the user, a GUI for recommending a room name and editing the room name, while displaying a map.

Referring to FIG. 15, the robotic cleaning apparatus 1000 may display the room names of the first divided region 140, the second divided region 142, and the third divided region 144, which are determined in FIG. 14, on a map.

It has been described with reference to FIGS. 12 through 15 that the robotic cleaning apparatus 1000 may divide an area in a map and determine a room name of a divided region, but the disclosure is not limited thereto. The map shown in FIGS. 12 through 15 may be displayed on a screen of the external device 2000 that is communication-connected with the robotic cleaning apparatus 1000 to control the robotic cleaning apparatus 1000, and the external device 2000 may divide an area in the map and determine the room name of a divided region.

FIG. 16 is a diagram illustrating an example of a graphical user interface (GUI) for obtaining reference map data according to various embodiments of the disclosure.

Figure 17:
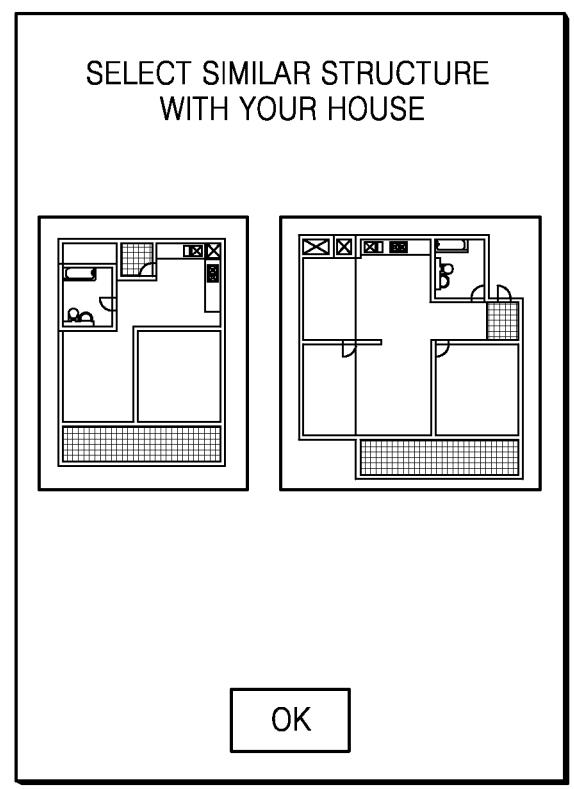
FIG. 17 is a diagram illustrating an example of a graphical user interface (GUI) for obtaining reference map data according to various embodiments of the disclosure.

FIG. 17 is a diagram illustrating an example of a graphical user interface (GUI) for obtaining reference map data according to various embodiments of the disclosure.

Referring to FIG. 16, to obtain a reference map, a GUI for inputting a user's address may be provided. The GUI for inputting the user's address may be displayed on a display of the robotic cleaning apparatus 1000 or a display of the external device 2000. Once the user's address is input through the GUI of FIG. 16, the reference map corresponding to the input user's address may be provided to the robotic cleaning apparatus 1000.

Referring to FIG. 17, a GUI for selecting a reference map may be provided. The GUI for selecting the reference map may be displayed on the display of the robotic cleaning apparatus 1000 or the display of the external device 2000. The GUI for selecting the reference map may include a list of reference maps. The reference maps included in the list may be determined by the user's address input in FIG. 16. Once a reference map is input through the GUI of FIG. 17, the selected reference map may be provided to the robotic cleaning apparatus 1000.

Figure 18:
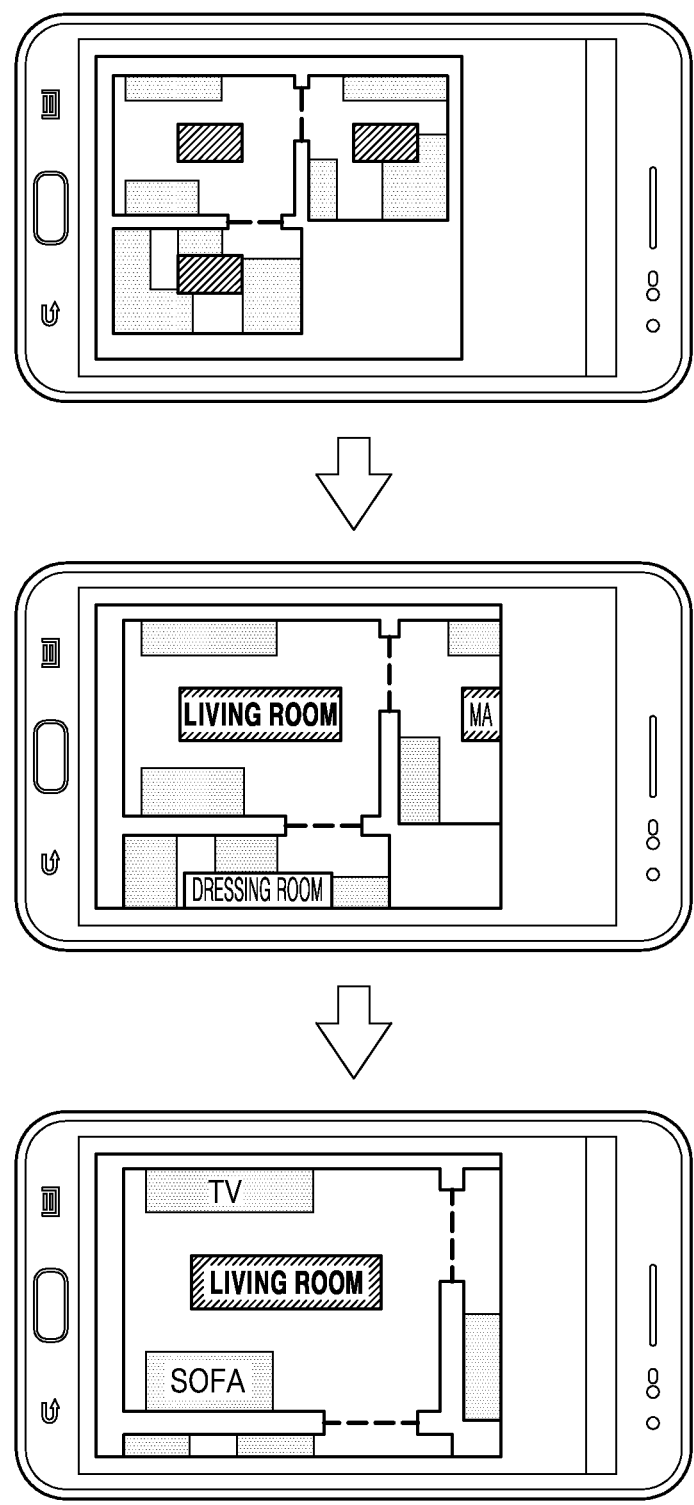
FIG. 18 is a diagram illustrating an example in which the names of rooms and types of furniture are enlarged and are displayed in detail as map data according to various embodiments of the disclosure.

FIG. 18 is a diagram illustrating an example in which the names of rooms and types of furniture are enlarged and displayed in detail as map data according to various embodiments of the disclosure.

Referring to FIG. 18, as map data is enlarged, an identification value for a divided region in a map and a name of an object in the divided region are sequentially displayed.

Figure 19:
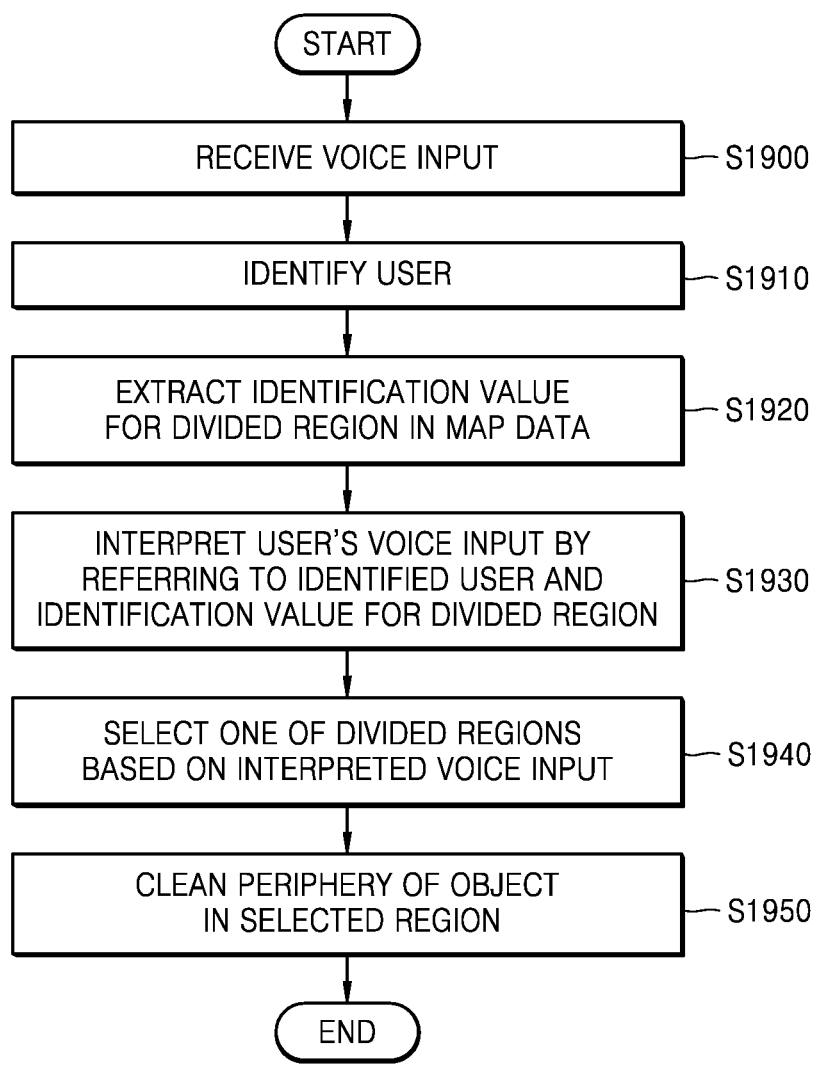
FIG. 19 is a flowchart illustrating an example method, performed by a robotic cleaning apparatus, of performing cleaning based on a voice input, according to various embodiments of the disclosure.

FIG. 19 is a flowchart illustrating an example method, performed by a robotic cleaning apparatus, of performing cleaning based on a voice input, according to various embodiments of the disclosure.

In operation S1900, the robotic cleaning apparatus 1000 may receive a user's voice input. The robotic cleaning apparatus 1000 may receive a user's voice command through a microphone in the robotic cleaning apparatus 1000.

In operation S1910, the robotic cleaning apparatus 1000 may identify the user. The robotic cleaning apparatus 1000 may estimate the user by analyzing characteristics of the voice input of the user. The robotic cleaning apparatus 1000 may estimate user's gender and age by analyzing a voice color and a tone of the voice input. When the user's voice has already been registered in the robotic cleaning apparatus 1000, the robotic cleaning apparatus 1000 may identify the user. For example, the robotic cleaning apparatus 1000 may identify whether the user is a daughter or a father, based on the characteristics of the voice input of the user.

In operation S1920, the robotic cleaning apparatus 1000 may extract an identification value for a divided region in map data. The robotic cleaning apparatus 1000 may extract room names of divided region in a map from the map data.

In operation S1930, the robotic cleaning apparatus 1000 may interpret the user's voice input by referring to the identified user and the identification value for the divided region. The robotic cleaning apparatus 1000 may interpret the user's voice input, based on the identified user and the age and the gender of the user.

In operation S1940, the robotic cleaning apparatus 1000 may select one of the divided regions, based on the interpreted voice input. The robotic cleaning apparatus 1000 may identify a room name or an object name included in the voice input from the voice input and select one of the divided regions based on the identified room name or object name.

When a cleaning target region is unclear in the voice input, the robotic cleaning apparatus 1000 may determine the cleaning target region using identification information of the user who utters a voice. For example, when the user's voice input does not include information about a room to be cleaned, the robotic cleaning apparatus 1000 may identify the user as a father and select the main room as the cleaning target region.

For example, when the periphery of an object to be cleaned is not clear in the user's voice input, the robotic cleaning apparatus 1000 may estimate the cleaning target region based on user's identification information.

In operation S1950, the robotic cleaning apparatus 1000 may clean the periphery of the object in a selected divided region.

Figure 20:
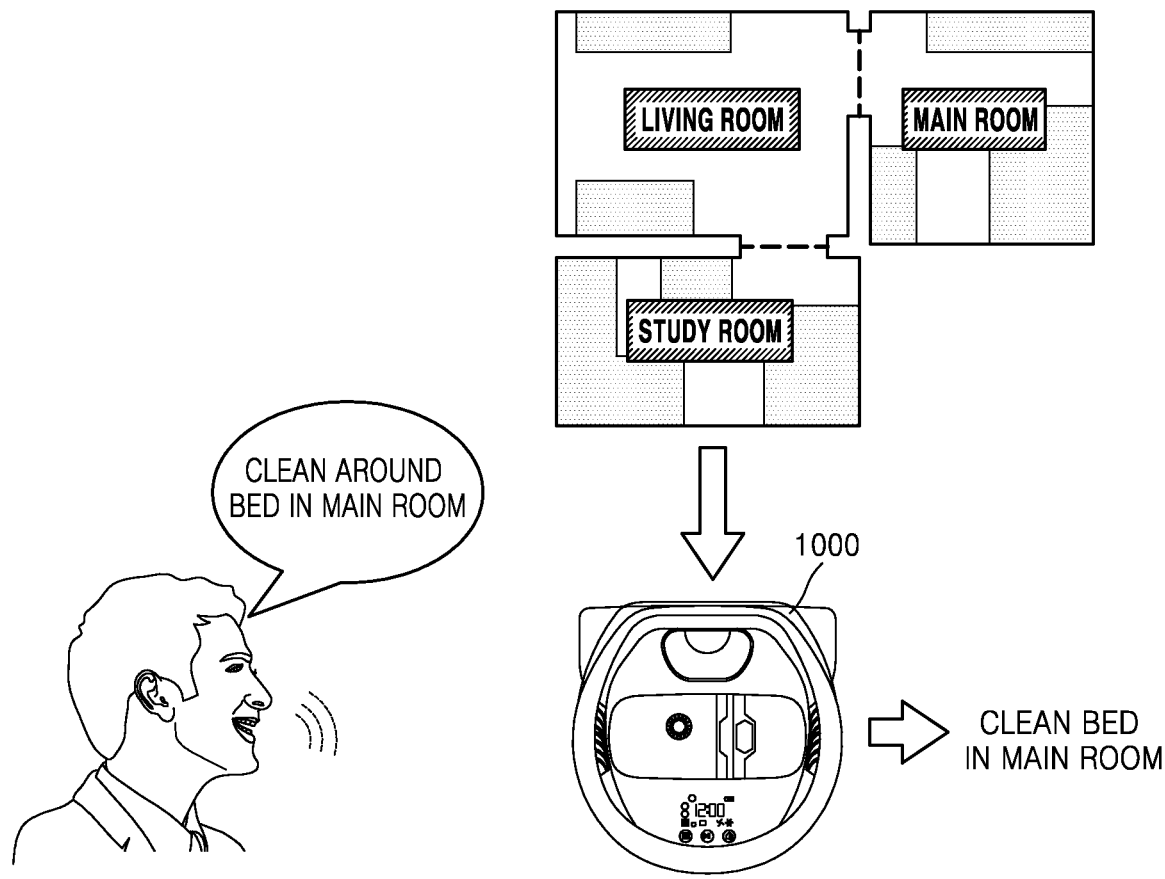
FIG. 20 is a diagram illustrating an example in which a robotic cleaning apparatus performs cleaning based on a voice input according to various embodiments of the disclosure.

FIG. 20 is a diagram illustrating an example in which a robotic cleaning apparatus performs cleaning based on a voice input according to various embodiments of the disclosure.

Figure 21:
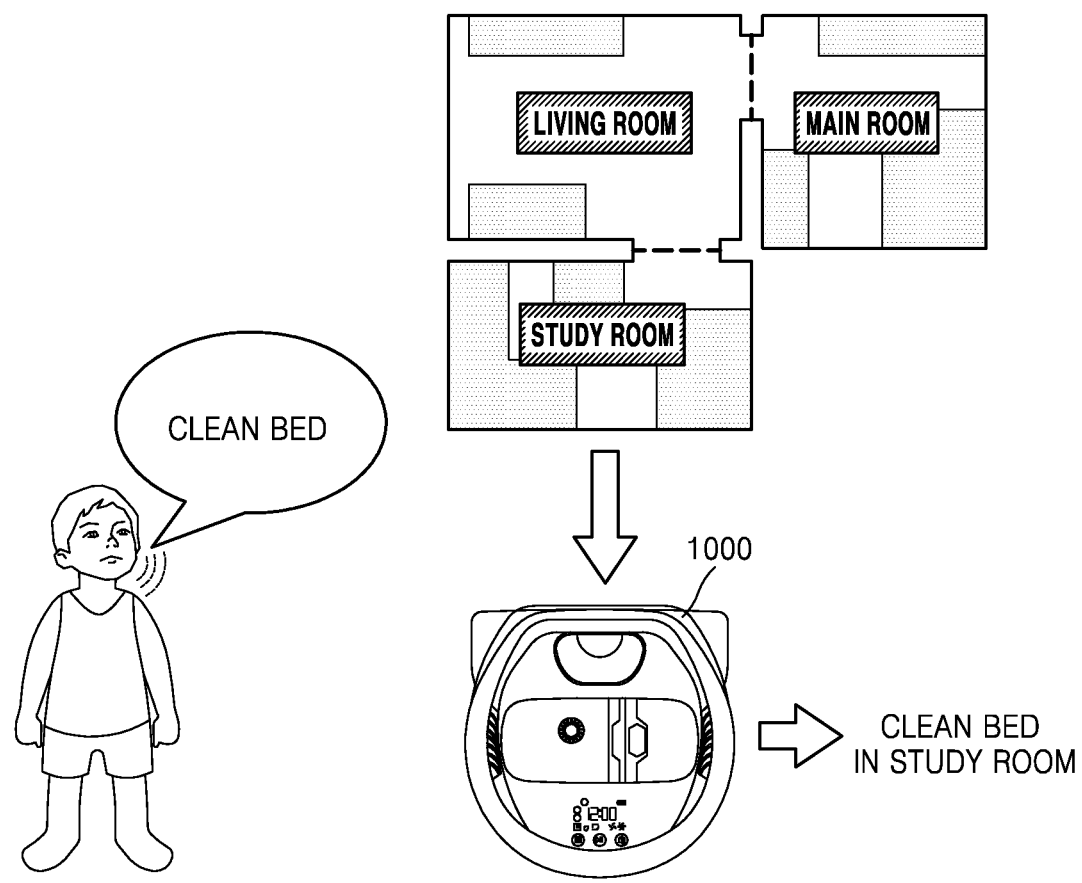
FIG. 21 is a diagram illustrating an example in which a robotic cleaning apparatus performs cleaning based on a voice input according to various embodiments of the disclosure.

FIG. 21 is a diagram illustrating an example in which a robotic cleaning apparatus performs cleaning based on a voice input according to various embodiments of the disclosure.

Referring to FIG. 20, the robotic cleaning apparatus 1000 may receive a voice input 'clean around bed in the main room' from the father, and interpret the voice input. Upon receiving the voice input to perform cleaning, the robotic cleaning apparatus 1000 may extract map data from a memory and determine a cleaning target region using the extracted map data. The robotic cleaning apparatus 1000 may determine that a divided region and an object corresponding to the 'main room' and the 'bed' included in the voice input are included in the map data. The robotic cleaning apparatus 1000 may determine the periphery of the bed as the cleaning target region in the main room in the map, and clean the determined cleaning target region.

Referring to FIG. 21, the robotic cleaning apparatus 1000 may receive a voice input 'clean bed' from the daughter, and interpret the voice input. Upon receiving the voice input to perform cleaning, the robotic cleaning apparatus 1000 may extract map data from a memory and determine a cleaning target region using the extracted map data. The robotic cleaning apparatus 1000 may identify that an identification value for a divided region is not included in the voice input, and estimate a divided region to be cleaned. The robotic cleaning apparatus 1000 may identify a user making the voice input as a daughter, and determine a study room used by the daughter as a target to be cleaned. The robotic cleaning apparatus 1000 may determine that an object corresponding to the 'bed' included in the voice input is included in the map data. Thus, the robotic cleaning apparatus 1000 may determine the periphery of the bed as the cleaning target region in the study room in the map, and clean the determined cleaning target region.

Figure 22:
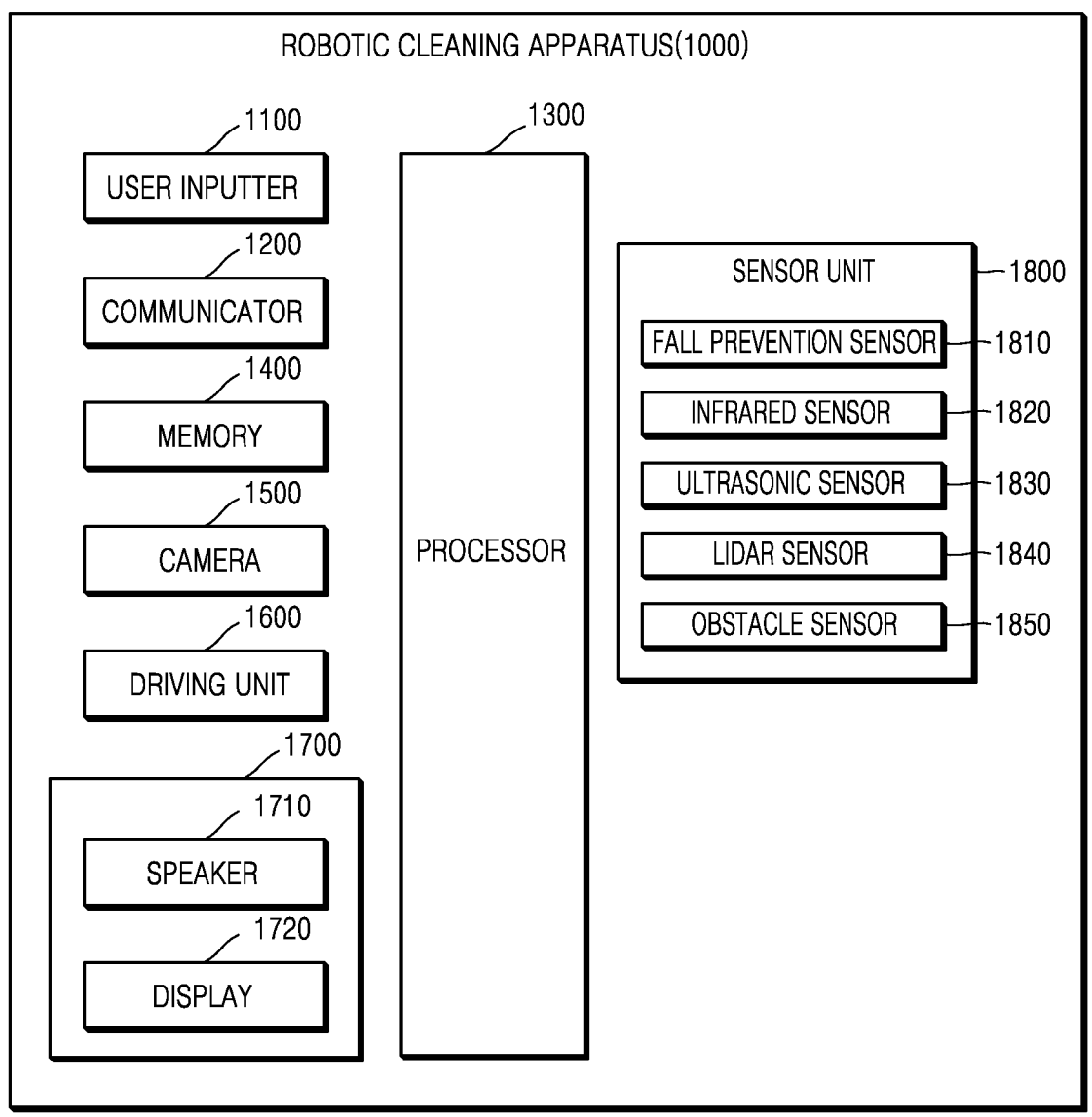
FIG. 22 is a block diagram illustrating an example robotic cleaning apparatus according to various embodiments of the disclosure.

FIG. 22 is a block diagram illustrating an example robotic cleaning apparatus 1000 according to various embodiments of the disclosure.

Referring to FIG. 22, the robotic cleaning apparatus 1000 according to various embodiments of the disclosure may include a user inputter (e.g., including input circuitry) 1100, a communicator (e.g., including communication circuitry) 1200, a memory 1400, a camera 1500, a driving unit (e.g., including a motor) 1600, an outputter (e.g., including output circuitry) 1700, a sensor unit (e.g., including at least one sensor) 1800, and a processor (e.g., including processing circuitry) 1300, in which the outputter 1700 may include a speaker 1710 and a display 1720.

The user inputter 1100 may include various input circuitry and receive a user input for controlling an operation of the robotic cleaning apparatus 1000. For example, the user inputter 1100 may include, various input circuitry, such as, for example, and without limitation, a keypad, a dome switch, a touch pad (a capacitive overlay type, a resistive overlay type, an infrared beam type, a surface acoustic wave type, an integral strain gauge type, a piezoelectric effect type, etc.), a jog wheel, a jog switch, etc.

The communicator 1200 may include various communication circuitry included, for example, in one or more communication modules for communication with the external device 2000 and the server 3000. For example, the communicator 1200 may include a short-range communicator and a mobile communicator. The short-range communicator may include, but is not limited to, a Bluetooth Low Energy (BLE) communication unit, a near field communication (NFC) unit, a wireless local area network (WLAN) (WiFi) communication unit, a ZigBee communication unit, an infrared Data Association (IrDA) communication unit, a WiFi Direct (WFD) communication unit, an ultra wideband (UWB) communication unit, and an Ant+ communication unit. The mobile communicator may transmit and receive a radio signal to and from at least one of a base station, an external terminal, or a server over a mobile communication network. Herein, the radio signal may include various forms of data corresponding to transmission/reception of a voice call signal, a video communication call signal, or a text/multimedia message.

The memory 1400 may store a program for controlling an operation of the robotic cleaning apparatus 1000. The memory 1400 may include at least one instruction for controlling an operation of the robotic cleaning apparatus 1000. The memory 1400 may store, for example, data for generating basic map data, the generated basic map data, and data for identifying an object and a divided region in a map. The memory 1400 may store an AI model for generating the map data, an AI model for interpreting a voice input, etc. The programs stored in the memory 1400 may be classified into a plurality of modules according to functions thereof.

The memory 1400 may include a storage medium of at least one type of a flash memory type, a hard disk type, a multimedia card micro type, a card type memory (e.g., a secure digital (SD) or extreme digital (XD) memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and so forth.

The camera 1500 may capture an image of the periphery of the robotic cleaning apparatus 1000. The camera 1500 may capture the image of the periphery or bottom of the robotic cleaning apparatus 1000 in real time, while the robotic cleaning apparatus 1000 performs cleaning.

The driving unit 1600 may include various components and circuitry for moving the robotic cleaning apparatus 1000, including, for example, at least one driving wheel for moving the robotic cleaning apparatus 1000. The driving unit 1600 may include a driving motor connected to a driving wheel to rotate the driving wheel. The driving wheel may include a left wheel and a right wheel respectively provided in a left side and a right side of a body of the robotic cleaning apparatus 1000. The left wheel and the right wheel may be driven by one driving motor, but depending on a need, a left-wheel driving motor for driving the left wheel and a right-wheel driving motor for driving the right wheel may be provided. In this case, a traveling direction of the robotic cleaning apparatus 1000 may turn to the left or to the right, having a difference in rotational speed between the left wheel and the right wheel.

The outputter 1700 may include various output circuitry and output an audio signal or a video signal. The outputter 1700 may include various output circuitry including, for example, and without limitation, a speaker 1710 and a display 1720. The speaker 1710 may output audio data received from the communicator 1200 or stored in the memory 1400. The speaker 1710 may output an audio signal related to a function (e.g., a call signal receiving sound, a message receiving sound, a notification sound, etc.) performed in the robotic cleaning apparatus 1000.

The display 1720 may display information processed in the robotic cleaning apparatus 1000. For example, the display 1720 may display a user interface for controlling the robotic cleaning apparatus 1000, a user interface for displaying a state of the robotic cleaning apparatus 1000, etc.

When the display 1720 and a touch pad are constructed as a touch screen in a layer structure, the display 1720 may be used as an input device as well as an output device.

The sensor unit 1800 may include at least one sensor that senses data related to an operation and a state of the robotic cleaning apparatus 1000 and sense data regarding contamination of a cleaning space. The sensor unit 1800 may include, for example, a fall prevention sensor 1810, an infrared sensor 1820, an ultrasonic sensor 1830, a lidar sensor 1840, an obstacle sensor 1850, an orientation sensor (not shown), and a position sensitive device (PSD) sensor (not shown).

The sensor unit 1800 may further include a motion detecting sensor (not shown) that detects a motion of the robotic cleaning apparatus 1000. For example, the sensor unit 1800 may include a gyro sensor, a wheel sensor, an acceleration sensor, etc.

The gyro sensor may sense a rotating direction and detect a rotation angle, when the robotic cleaning apparatus 1000 moves. The wheel sensor may be connected to the left wheel and the right wheel to sense the number of turns of the wheel. For example, the wheel sensor may be a rotary encoder, without being limited thereto.

The processor 1300 may include various processing circuitry and may generally control overall operations of the robotic cleaning apparatus 1000. For example, the processor 1300 may control in overall the user inputter 1100, the communicator 1200, the memory 1400, the camera 1500, the driving unit 1600, the outputter 170, and the sensor unit 1800 by executing programs stored in the memory 1400. The processor 1300 may control an operation of the robotic cleaning apparatus 1000 shown in FIGS. 1 through 21 by controlling the user inputter 1100, the communicator 1200, the memory 1400, the camera 1500, the driving unit 1600, the outputter 1700, and the sensor 1800.

The processor 1300 may generate basic map data. When the robotic cleaning apparatus 1000 travels in the cleaning space, the processor 1300 may sense a region where the robotic cleaning apparatus 1000 is allowed to travel in the cleaning space, thus generating the basic map data of the cleaning space. When the robotic cleaning apparatus 1000 initially travels in the cleaning space, the processor 1300 may perform a function for generating the basic map data of the cleaning space. In this case, the processor 1300 may travel in the cleaning space to generate the basic map data until a preset condition is satisfied.

The processor 1300 may use a reference map to generate the basic map data. For example, the processor 1300 may store a sample of a plane view, and may use the stored sample of the plane view to generate the basic map data.

The processor 1300 may generate object information regarding the object in the cleaning space. While the robotic cleaning apparatus 1000 travels in the cleaning space, the processor 1300 may capture an image of the object in the cleaning space a plurality of times using a camera. The processor 1300 may generate the object information using a plurality of images generated through capturing of the object. The object information, which indicates an attribute of the object, e.g., a type of the object, a size of the object, and a position of the object. The object may include things, for example, furniture, a home appliance, a living tool, etc., in the cleaning space.

The processor 1300 may sense a position and an orientation of the robotic cleaning apparatus 1000 at the time when the image of the object is captured, and measure the time of capturing the image of the object. The processor 1300 may use information about the position and the orientation of the robotic cleaning apparatus 1000, and the time of capturing the image of the object, to generate the object information. To generate the object information, the processor 1300 may use at least one AI model.

The processor 1300 may divide an area in the basic map data into a plurality of regions. The processor 1300 may modify the basic map data based on the type and the position of the object in the cleaning space, and divide an area in the modified basic map data into a plurality of regions. The processor 1300 may modify an outer wall of the cleaning space in the basic map data based on the position of the object, and display the position of the object in the cleaning space. The processor 1300 may identify an object located in the cleaning space, and divide the cleaning space into the plurality of regions based on a type of the object in the cleaning space.

The processor 1300 may determine identification values for the divided regions. The processor 1300 may determine an identification value for a divided region, based on a type of an object in the divided region. When an object is identified in a divided region, the processor 1300 may determine an identification value corresponding to the identified object as an identification value for the divided region. When a combination of objects is identified in a divided region, the processor 1300 may determine an identification value corresponding to the identified combination of the objects as an identification value for the divided region. The processor 1300 may previously store data regarding which region a divided region is highly probable, based on a type of an object identified in the divided region.

The processor 1300 may capture an image of an object using a camera. While the robotic cleaning apparatus 1000 travels in the cleaning space, the processor 1300 may monitor whether an object is present in the periphery of the robotic cleaning apparatus 1000 using a camera. When an object is found in the periphery of the robotic cleaning apparatus 1000, the processor 1300 may capture an image of the object using the camera. The processor 1300 may capture the image of the object when the entire object is recognized using the camera.

While the robotic cleaning apparatus 1000 travels in the cleaning space, the processor 1300 may monitor whether an object is present in the periphery of the robotic cleaning apparatus 1000 using at least one sensor.

The processor 1300 may identify an orientation of the robotic cleaning apparatus 1000. The processor 1300 may identify the orientation of the robotic cleaning apparatus 1000 at the time when the image of the object is captured. The processor 1300 may use an orientation sensor to identify the orientation of the robotic cleaning apparatus 1000, in which an orientation value of the robotic cleaning apparatus 1000 may be stored, matching a captured object image.

The processor 1300 may identify the position of the robotic cleaning apparatus 1000. The processor 1300 may identify the position of the robotic cleaning apparatus 1000 at the time when the image of the object is captured. The position of the robotic cleaning apparatus 1000 may be the position of the robotic cleaning apparatus 1000 in the cleaning space. The position of the robotic cleaning apparatus 1000 may be a relative position of the robotic cleaning apparatus 1000 with respect to an object.

The processor 1300 may determine a type and a position of an object in the cleaning space. The processor 1300 may determine the type and the position of the object in the cleaning space, using the captured object image, the orientation value of the robotic cleaning apparatus 1000, and the position of the robotic cleaning apparatus 1000.

The processor 1300 may obtain a reference map to generate basic map data. The reference map may be a plane view indicating a structure of the cleaning space. The processor 1300 may obtain a user's address. The processor 1300 may display a GUI for inputting a user's address on the display of the robotic cleaning apparatus 1000. The processor 1300 may obtain the user's address based on the user input made through the displayed GUI.

The processor 1300 may obtain reference map data corresponding to the user's address. For example, the processor 1300 may obtain a plane view of an apartment corresponding to the user's address. The processor 1300 may extract or receive the reference map data corresponding to the user's address from a memory or from a server. The processor 1300 may display a recommended reference map list, and may obtain reference map data selected from the recommended reference map list.

The processor 1300 may receive a user's voice input. The processor 1300 may receive a user's voice command through a microphone in the robotic cleaning apparatus 1000.

The processor 1300 may identify the user. The processor 1300 may estimate the user by analyzing characteristics of the voice input of the user. The processor 1300 may estimate user's gender and age by analyzing a voice color and a tone of the voice input. When the user's voice has already been registered in the robotic cleaning apparatus 1000, the processor 1300 may identify the user.

The processor 1300 may extract an identification value for a divided region in map data. The processor 1300 may extract room names of divided region in a map from the map data.

The processor 1300 may interpret the user's voice input by referring to the identified user and the identification value for the divided region. The processor 1300 may interpret the user's voice input, based on the identified user and the age and the gender of the user.

The processor 1300 may select one of the divided regions, based on the interpreted voice input. The processor 1300 may identify a room name or an object name included in the voice input from the voice input and select one of the divided regions based on the identified room name or object name. The processor 1300 may clean the periphery of the object in a selected divided region.

Figure 23:
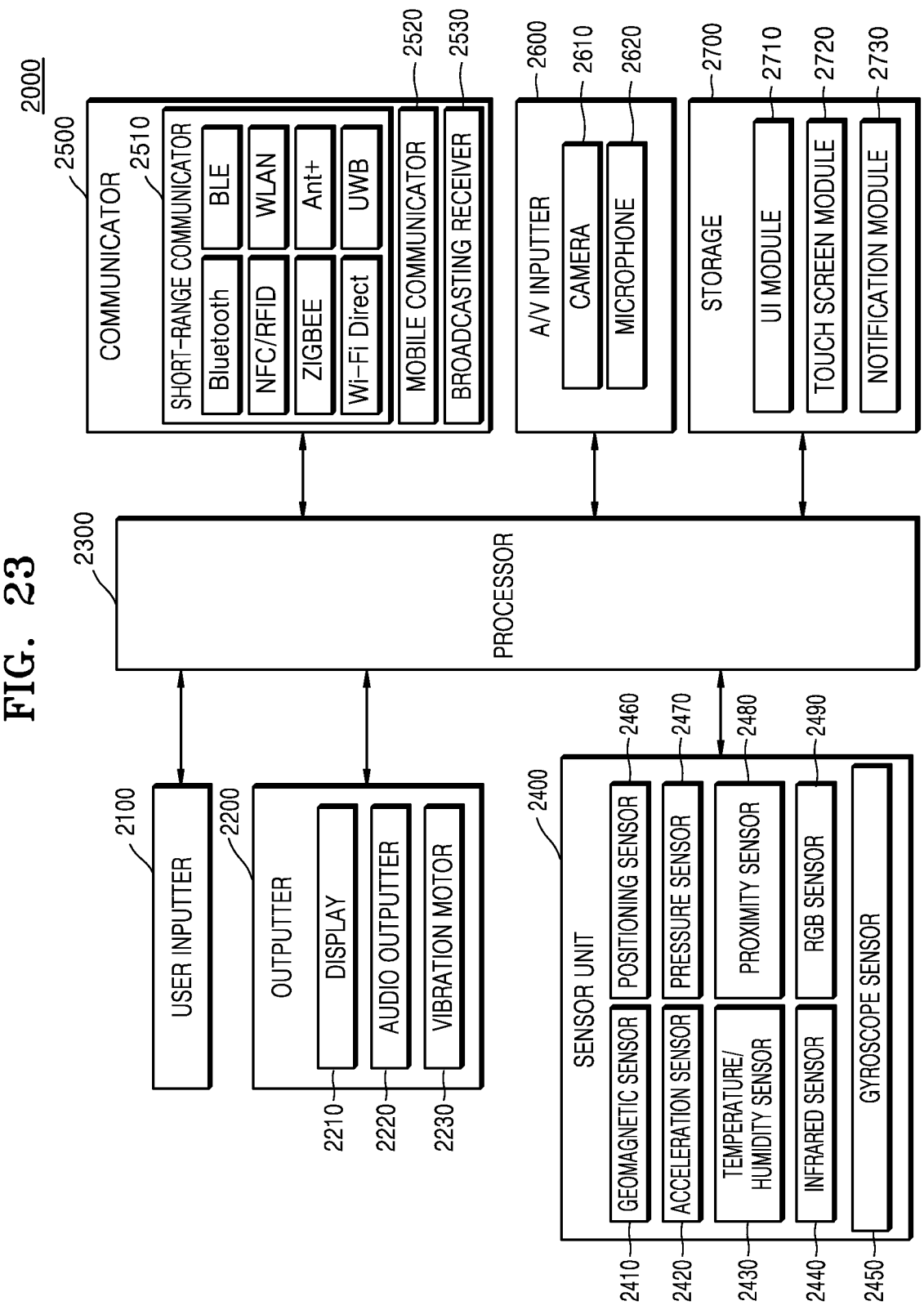
FIG. 23 is a block diagram illustrating an example external device according to various embodiments of the disclosure.

FIG. 23 is a block diagram illustrating an example external device 2000 according to various embodiments of the disclosure.

As shown in FIG. 23, the external device 2000 according to various embodiments of the disclosure may include an inputter (e.g., including input circuitry) 2100, an outputter (e.g., including output circuitry) 2200, a processor (e.g., including processing circuitry) 2300, a sensor unit (e.g., including at least one sensor) 2400, a communicator (e.g., including communication circuitry) 2500, an A/V inputter (e.g., including audio/visual input circuitry) 2600, and a memory 2700.

The user inputter 2100 may include various circuitry for inputting data used for the user to control the external device 2000, and the outputter 2200 may include various output circuitry and output an audio signal, a video signal, a vibration signal, or the like, and may include a display 2210, an audio outputter 2220 including audio output circuitry, and a vibration motor 2230.

The display 2210 may display information processed by the external device 2000. For example, the display 2210 may display a GUI for controlling the robotic cleaning apparatus 1000 and generating map data.

When the display 2210 and a touch pad are constructed as a touch screen in a layer structure, the display 2210 may be used as an input device as well as an output device. According to implementation types of the external device 2000, the external device 2000 may include two or more displays 2210.

The audio outputter 2220 may include various audio output circuitry and output audio data received from the communicator 2500 or stored in the memory 2700.

The processor 2300 may include various processing circuitry and control an overall operation of the external device 2000. For example, the processor 2300 1630 may control in overall the user inputter 2100, the outputter 2200, the sensor unit 2400, the communicator 2500, and the A/V inputter 2600, by executing programs stored in the memory 2700.

The processor 2300 may control an operation of the external device 2000 herein, by executing the programs stored in the memory 2700.

The processor 2300 of the external device 2000 may generate map data of the cleaning space using an object image captured by the robotic cleaning apparatus 1000 and sensing data sensed from the robotic cleaning apparatus 1000. The processor 2300 of the external device 2000 may perform some of operations of the robotic cleaning apparatus 1000 shown in FIGS. 1 through 22 for generation of the basic map data, identification of an object in the cleaning space, determination of an identification value for the cleaning space, etc. In this case, the external device 2000 may transmit and receive data to and from the robotic cleaning apparatus 1000.

The sensor unit 2400 may include at least one sensor and sense a state of the external device 2000 or a state around the external device 2000, and deliver sensed information to the processor 2300. For example, and without limitation, the sensor unit 2400 may include sensors such as, for example, and without limitation, a geomagnetic sensor 2410, an acceleration sensor 2420, a temperature/humidity sensor 2430, an infrared sensor 2440, a gyroscope sensor 2450, a positioning sensor 2460, a pressure sensor 2470, a proximity sensor 2480, a color (RGB) sensor 2490, or the like.

The communicator 2500 may include one or more elements including various communication circuitry for communication with the robotic cleaning apparatus 1000 and the server 3000. For example, the communicator 2500 may include a short-range communicator 2510, a mobile communicator 2520, and a broadcasting receiver 2530.

The A/V inputter 2600 may include various audio/visual input circuitry and input an audio signal or a video signal, and may include a camera 2610, a microphone 2620, and so forth.

The microphone 2620 may receive an external audio signal and processes the received signal into electric voice data.

The memory 2700 may store programs for processing and control of the processor 2300 and data input to or output from the external device 2000.

The memory 2700 may include a storage medium of at least one type of a flash memory type, a hard disk type, a multimedia card micro type, a card type memory (e.g., a secure digital (SD) or extreme digital (XD) memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and so forth.

The programs stored in the memory 2700 may be classified into a plurality of modules depending on a function thereof, e.g., a user interface (UI) module 2710, a touch screen module 2720, a notification module 2730, and so forth.

Figure 24:
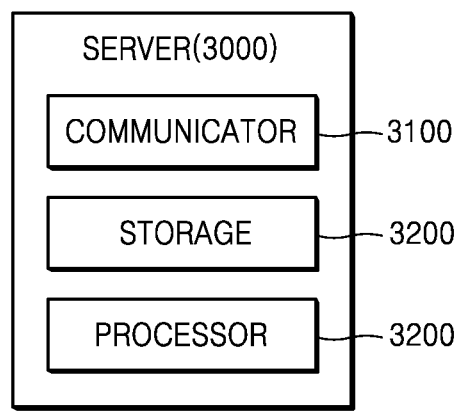
FIG. 24 is a block diagram illustrating an example server according to various embodiments of the disclosure.

FIG. 24 is a block diagram illustrating an example server 3000 according to various embodiments of the disclosure.

Referring to FIG. 24, the server 3000 according to various embodiments of the disclosure may include a communicator (e.g., including communication circuitry) 3100, a storage 3200, and a processor (e.g., including processing circuitry) 3300.

The communicator 3100 may include one or more communication modules including various communication circuitry for communication with the robotic cleaning apparatus 1000 and the external device 2000. For example, the communicator 3100 may include a short-range communicator and a mobile communicator. The short-range communicator may include, but is not limited to, a Bluetooth Low Energy (BLE) communication unit, a near field communication (NFC) unit, a wireless local area network (WLAN) (WiFi) communication unit, a ZigBee communication unit, an infrared Data Association (IrDA) communication unit, a WiFi Direct (WFD) communication unit, an ultra wideband (UWB) communication unit, and an Ant+ communication unit. The mobile communicator may transmit and receive a radio signal to and from at least one of a base station, an external terminal, or a server over a mobile communication network. Herein, the radio signal may include various forms of data corresponding to transmission/reception of a voice call signal, a video communication call signal, or a text/multimedia message.

The storage 3200 may store a program for controlling an operation of the server 3000. The storage 3200 may include at least one instruction for controlling an operation of the server 3000. The storage 3200 may store data needed for generation of map data, an AI model for generating the map data, an AI model for interpreting a voice input, etc. The programs stored in the storage 3200 may be classified into a plurality of modules according to functions thereof.

The storage 3200 may include a plurality of databases (DBs) to integrally manage user IDs of several users, map data of several robotic cleaning apparatuses, sensing data, etc.

The processor 3300 may include various processing circuitry and generally control overall operations of the server 3000. For example, the processor 3300 may control the communicator 3100 and the storage 3200, by executing the programs stored in the storage 3200. The processor 3300 may provide data needed for the robotic cleaning apparatus 1000 and/or the external device 2000 to generate the map data to the robotic cleaning apparatus 1000 and/or the external device 2000 herein, by controlling the communicator 3100 and the storage 3200.

Through interworking between the robotic cleaning apparatus 1000 and the server 300, object identification data, object information, and map data may be generated.

The server 3000 may generate at least one AI model by learning a criterion for data to be used for generation of the object identification data, generation of the object information, and generation of the map data and a criterion for how to recognize data for generation of the object identification data, generation of the object information, and generation of the map data.

The robotic cleaning apparatus 1000 may generate the object identification data, the object information, and the map data by inputting preset data to the AI model generated by the server 3000. For example, the robotic cleaning apparatus 1000 may transmit data needed for generation of the object identification data, the object information, and/or the map data to the server 3000, and request the server 3000 to apply the transmitted data to the AI model. The robotic cleaning apparatus 1000 may receive the object identification data, the object information, and/or the map data generated by the server 3000 from the server 3000.

The robotic cleaning apparatus 1000 may receive the AI model generated by the server 3000 from the server 3000, and perform generation of the object identification data, generation of the object information, and generation of the map data using the received AI model.

Various embodiments of the disclosure may be implemented with a recording medium including computer-executable instructions such as a computer-executable programming module. A computer-readable recording medium may be an available medium that is accessible by a computer, and includes all of a volatile medium, a non-volatile medium, a separated medium, and a non-separated medium. The computer-readable recording medium may also include a computer storage medium. The computer storage medium includes all of a volatile medium, a non-volatile medium, a separated medium, and a non-separated medium, which is implemented by a method or technique for storing information such as computer-readable instructions, a data structure, a programming module, or other data.

In the disclosure, the term "unit" may be a hardware component like a processor or a circuit, and/or a software component executed by a hardware component like a processor.

Those of ordinary skill in the art to which the disclosure pertains will appreciate that the disclosure may be implemented in different detailed forms without departing from the technical spirit or essential characteristics of the disclosure. Accordingly, the aforementioned example embodiments of the disclosure should be understood as being only illustrative, but should not be considered as being restrictive. For example, each element described as a single type may be implemented in a distributed manner, and likewise, elements described as being distributed may be implemented as a coupled type.

The scope of the disclosure includes the following claims and is not limited to the detailed description, and the meanings and scope of the claims and all changes or modified forms derived from their equivalents should be understood as falling within the scope of the disclosure.

What is claimed is:

1. A robotic cleaning apparatus configured to generate map data, the robotic cleaning apparatus comprising:
   a communication interface comprising communication circuitry;
   a memory configured to store one or more instructions; and
   a processor configured to control the robotic cleaning apparatus by executing the one or more instructions, to:
   generate basic map data related to a cleaning space;
   generate object information regarding at least one object in the cleaning space;
   divide an area in the basic map data into a plurality of regions based on the object information; and
   determine identification values of the plurality of divided regions based on the object information.

2. The robotic cleaning apparatus of claim 1, wherein the object information comprises information about a type and a position of the object.

3. The robotic cleaning apparatus of claim 1, wherein the processor is further configured, by executing the one or more instructions, to control the robotic cleaning apparatus to:
   capture an object image of the object using a camera;
   generate orientation information indicating an orientation of the robotic cleaning apparatus based on the object image of the object being captured; and
   input the object image and the orientation information to a first artificial intelligence (AI) model to obtain object identification data indicating a type of the object and a position of the object in the object image.

4. The robotic cleaning apparatus of claim 3, wherein the first AI model includes an AI algorithm, and is trained using at least one of machine learning, a neural network, a genetic algorithm, deep learning, or a classification algorithm.

5. The robotic cleaning apparatus of claim 3, wherein the processor is further configured, by executing the one or more instructions, to control the robotic cleaning apparatus to:
   obtain a plurality of pieces of object identification data based on an image of the object captured in a plurality of positions in the cleaning space; and
   determine the position of the object in the basic map data based on the plurality of pieces of object identification data using triangulation.

6. The robotic cleaning apparatus of claim 3, wherein the processor is further configured, by executing the one or more instructions, to control the robotic cleaning apparatus to:
   obtain a plurality of pieces of object identification data based on an image of the object captured in a plurality of positions in the cleaning space; and
   determine the position of the object in the basic map data by inputting the plurality of pieces of object identification data to a second AI model.

7. The robotic cleaning apparatus of claim 6, wherein the second AI model includes an AI algorithm, and is trained using at least one of machine learning, a neural network, a genetic algorithm, deep learning, or a classification algorithm.

8. The robotic cleaning apparatus of claim 1, wherein the processor is further configured, by executing the one or more instructions, to control the robotic cleaning apparatus to estimate identification values for the plurality of divided regions based on a type and a position of an object located in the plurality of divided regions.

9. The robotic cleaning apparatus of claim 8, wherein the processor is further configured, by executing the one or more instructions, to control the robotic cleaning apparatus to display a list of the estimated identification values and determine the identification values for the plurality of divided regions based on a user input to select an identification value from the displayed list.

10. The robotic cleaning apparatus of claim 1, wherein the processor is further configured, by executing the one or more instructions, to control the robotic cleaning apparatus to receive a voice input of a user, identify the user based on the received voice input, interpret the received voice based on an identification value of the user, and perform cleaning based on interpretation of the voice.

11. The robotic cleaning apparatus of claim 10, wherein the processor is further configured, by executing the one or more instructions, to control the robotic cleaning apparatus to:
   select one of the plurality of divided regions based on the identification value of the user and the voice input; and
   perform cleaning with respect to a region around an object in the selected region.

12. A method, performed by a robotic cleaning apparatus, of generating map data, the method comprising:
   generating basic map data related to a cleaning space;
   generating object information regarding at least one object in the cleaning space;
   dividing an area in the basic map data into a plurality of regions based on the object information; and
   determining identification values for the plurality of divided regions based on the object information.

13. The method of claim 12, wherein the object information comprises information about a type and a position of the object.

14. The method of claim 12, further comprising:
   capturing an object image of the object using a camera;

generating orientation information indicating an orientation of the robotic cleaning apparatus based on the object image of the object being captured; and inputting the object image and the orientation information to a first artificial intelligence (AI) model to obtain object identification data indicating a type of the object and a position of the object in the object image.

15. The method of claim 13, wherein the first AI model includes an AI algorithm, and is trained using at least one of machine learning, a neural network, a genetic algorithm, deep learning, or a classification algorithm.

16. The method of claim 14, wherein the obtaining of the object identification data comprises obtaining a plurality of pieces of object identification data based on an image of the object captured in a plurality of positions in the cleaning space, and the generating of the object information comprises determining the position of the object in the basic map data based on the plurality of pieces of object identification data using triangulation.

17. The method of claim 14, wherein the obtaining of the object identification data comprises obtaining a plurality of pieces of object identification data based on an image of the object captured in a plurality of positions in the cleaning space, and the generating of the object information further comprises determining the position of the object in the basic map data by inputting the plurality of pieces of object identification data to a second AI model.

18. The method of claim 17, wherein the second AI model includes an AI algorithm, and is trained using at least one of machine learning, a neural network, a genetic algorithm, deep learning, or a classification algorithm.

19. The method of claim 12, wherein the determining of the identification values for the plurality of divided regions comprises estimating the identification values for the plurality of divided regions based on a type and a position of an object located in the plurality of divided regions.

20. A computer program product comprising a non-transitory computer-readable recording medium having recorded thereon a program for executing the operations of claim 12 on a computer.

* * * * *